United States Patent
Bifulco

(10) Patent No.: US 6,601,499 B1
(45) Date of Patent: Aug. 5, 2003

(54) APPARATUS FOR MARINATING, TENDERIZING, STRIP CUTTING CUBE CUTTING AND PROGRESSIVELY FLATTENING MEAT

(76) Inventor: Phil Bifulco, 1147 SW. First Way, Deerfield Beach, FL (US) 33441

( * ) Notice: Subject to any disclaimer, the term of this patent is extended or adjusted under 35 U.S.C. 154(b) by 202 days.

(21) Appl. No.: 09/696,918

(22) Filed: Oct. 26, 2000

Related U.S. Application Data

(63) Continuation-in-part of application No. 09/246,682, filed on Feb. 8, 1999, now Pat. No. 6,257,132, which is a continuation-in-part of application No. 09/122,737, filed on Jul. 27, 1998, now abandoned.

(51) Int. Cl.[7] .............................. B30B 5/06; B30B 5/04
(52) U.S. Cl. ..................... 100/73; 99/534; 100/152; 100/161; 100/168; 100/910; 452/142
(58) Field of Search ............................. 100/73–75, 152, 100/161, 168, 173, 176, 910; 99/349, 534–536; 452/142

(56) References Cited

U.S. PATENT DOCUMENTS

| | | | |
|---|---|---|---|
| 320,848 A | | 6/1885 | Cathcart |
| 1,691,361 A | | 11/1928 | Roberts |
| 1,989,388 A | * | 1/1935 | Watkins ...................... 100/176 |
| 2,135,960 A | | 11/1938 | Campbell |
| 2,163,648 A | * | 6/1939 | Watkins et al. ............. 100/176 |
| 2,243,492 A | | 5/1941 | Wilson |
| 2,718,028 A | | 9/1955 | Read et al. |
| 3,269,302 A | * | 8/1966 | Manaster .................... 452/142 |
| 3,291,036 A | | 12/1966 | Perl |
| 3,716,893 A | | 2/1973 | Vogelsang |
| 3,719,504 A | * | 3/1973 | Greenspan et al. ........... 99/534 |
| 3,951,059 A | | 4/1976 | Morris |
| 4,085,482 A | | 4/1978 | Charron |
| 4,261,257 A | | 4/1981 | Henderson et al. |
| 4,313,963 A | * | 2/1982 | Greenspan .................... 99/534 |
| 4,467,497 A | | 8/1984 | Peterson et al. |
| 4,488,480 A | | 12/1984 | Miller et al. |
| 4,558,725 A | * | 12/1985 | Veneziale .................... 100/176 |
| 4,574,771 A | | 3/1986 | Gutekunst |
| 5,114,379 A | | 5/1992 | Prosenbauer |
| 5,850,786 A | | 12/1998 | Bifulco |
| 6,042,467 A | * | 3/2000 | Leech et al. ................. 452/142 |

FOREIGN PATENT DOCUMENTS

| | | |
|---|---|---|
| EP | 0 053 656 | 6/1982 |
| IT | 463676 | 5/1951 |
| SU | 358218 | 12/1972 |

* cited by examiner

*Primary Examiner*—Stephen F. Gerrity
(74) *Attorney, Agent, or Firm*—Oltman, Flynn & Kubler

(57) ABSTRACT

An apparatus for flattening pieces of meat without piercing nor shredding the meat including a first roller set, each roller in the first roller set having non-sharpened outer edges; a second roller set, each roller in the second roller set having non-sharpened outer edges, the first roller set directly opposing and being spaced and fully separated from the second roller set, the first and second roller sets together having a product in-feed end into which meat pieces are drawn and having a product out-feed end at which flattened meat pieces are expelled from between the first and second roller sets; an adjustment mechanism for adjusting the spacing between the first roller set and the second roller set, where meat passing between the first and second roller sets is substantially flattened but not pierced nor shredded; and an in-feed conveyor belt assembly at the in-feed end including an in-feed conveyor belt and a rolling mechanism for rolling the in-feed conveyor belt in a direction to advance meat pieces placed on the in-feed conveyor belt to the in-feed end.

11 Claims, 26 Drawing Sheets

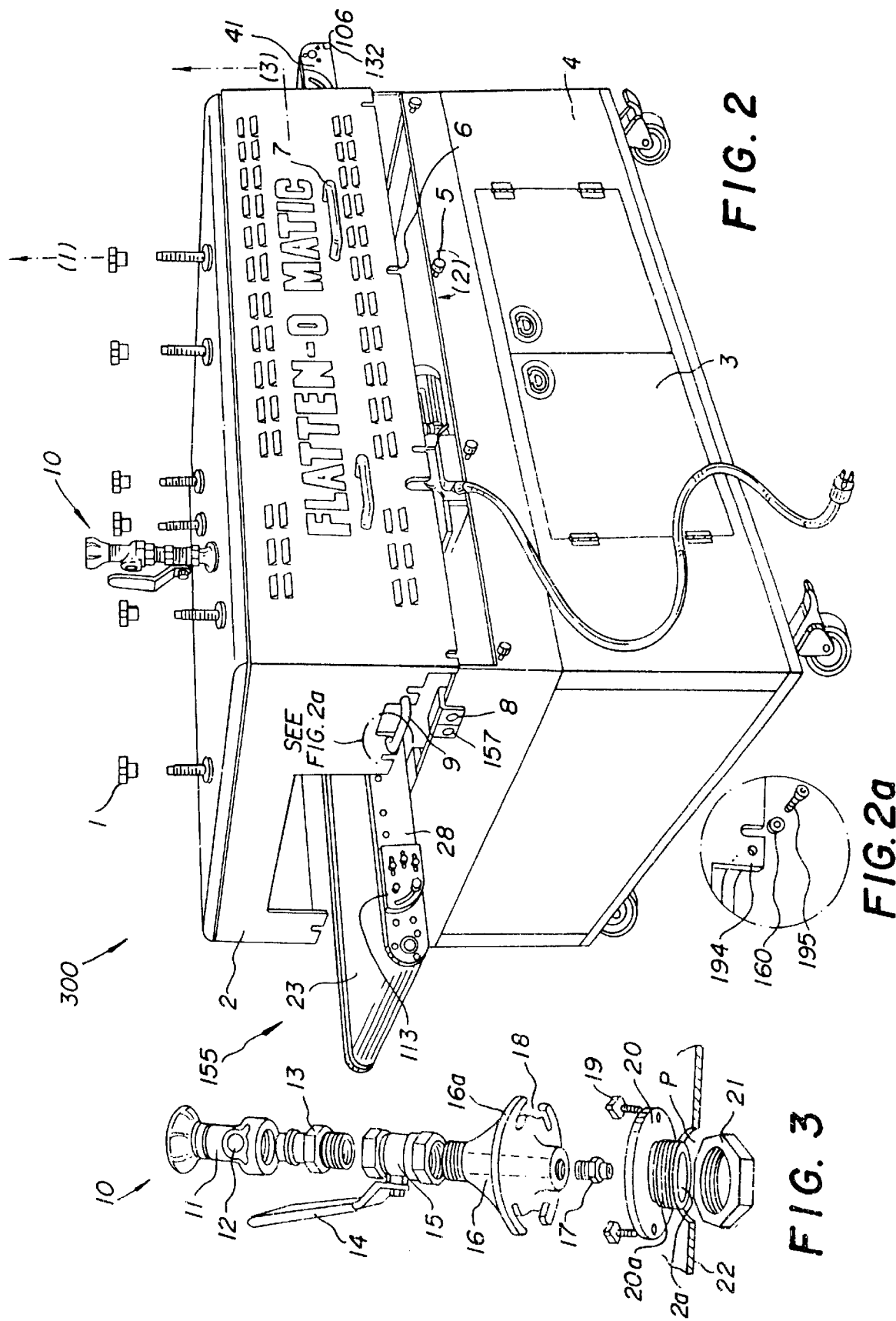

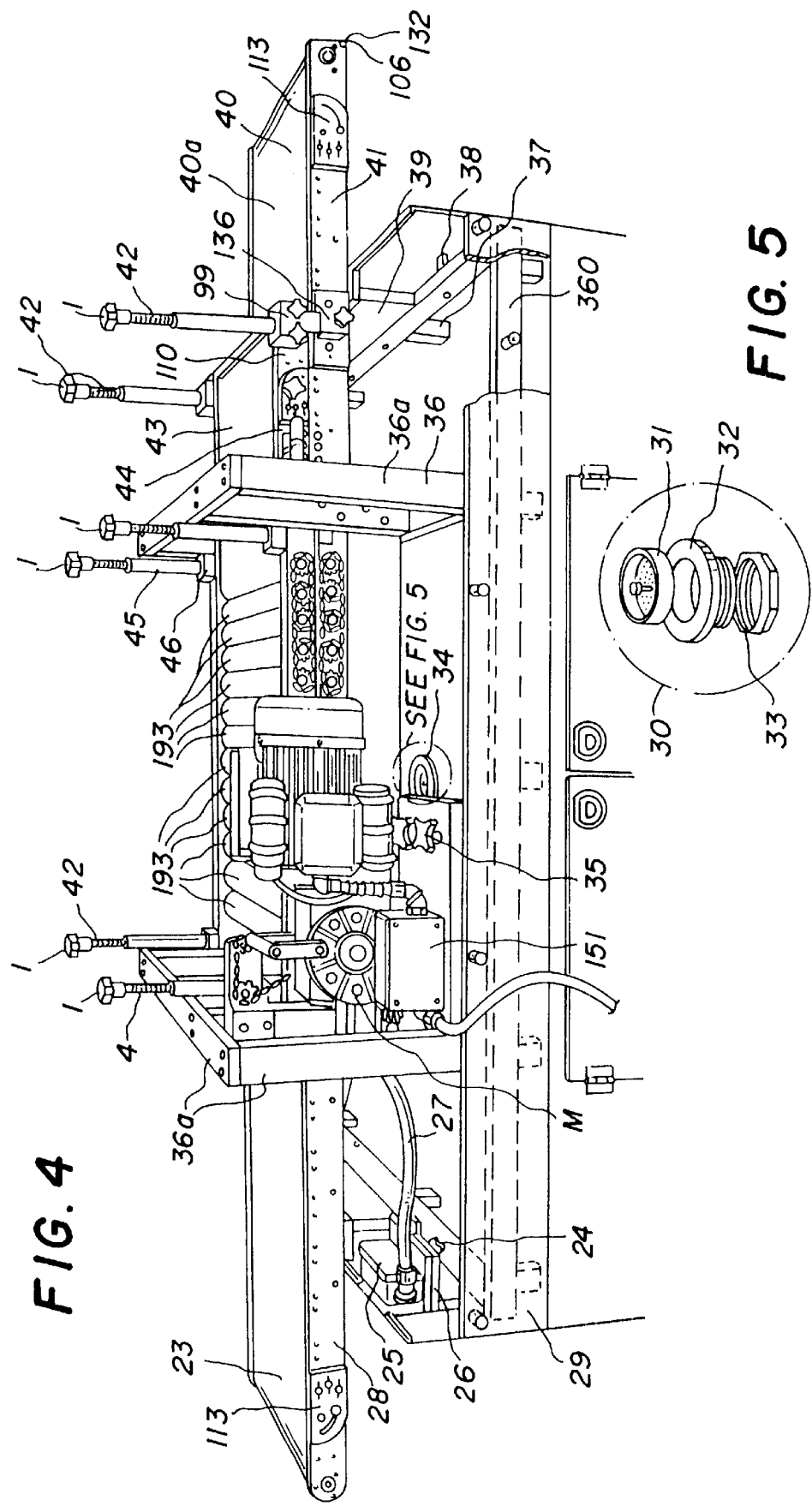

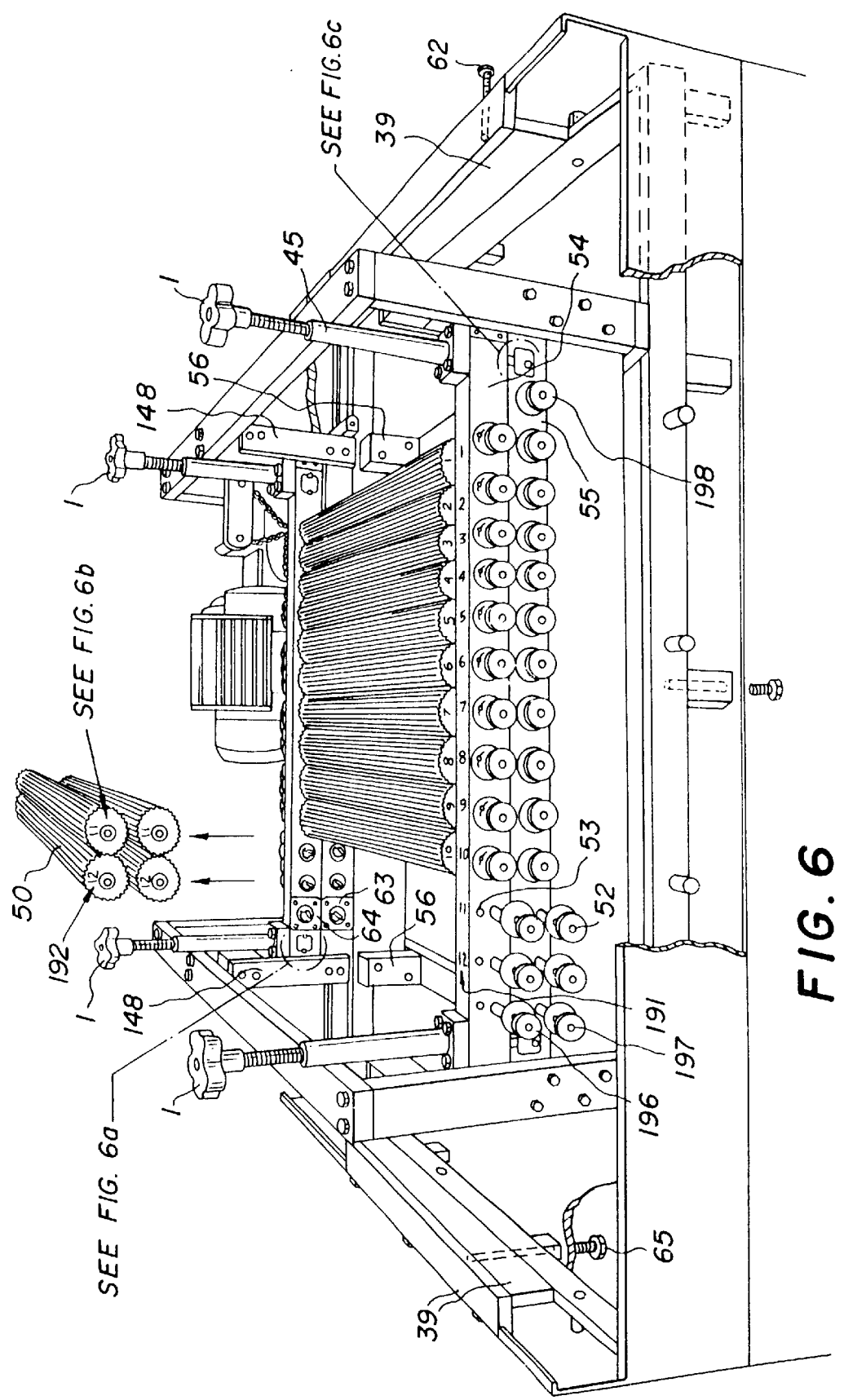

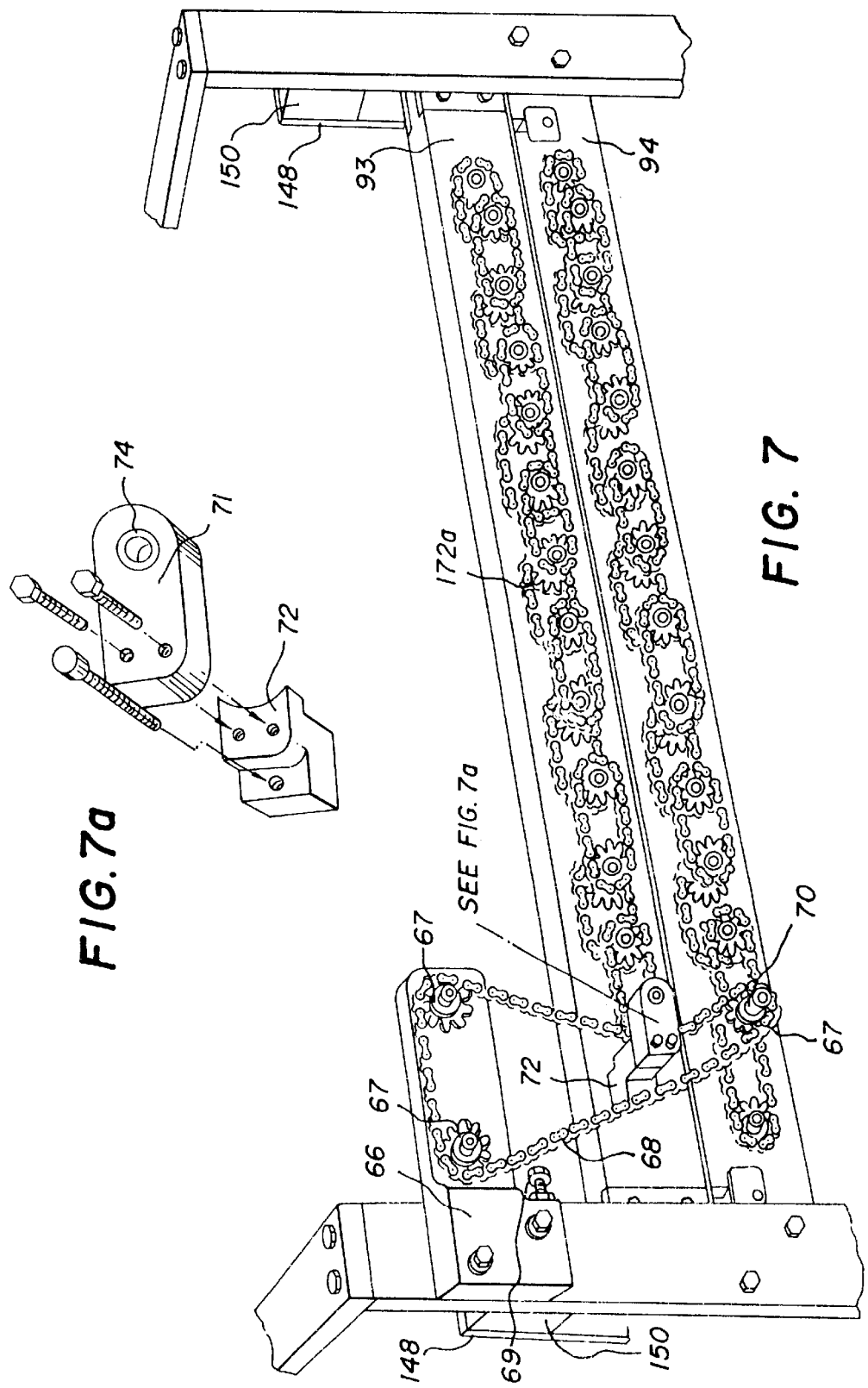

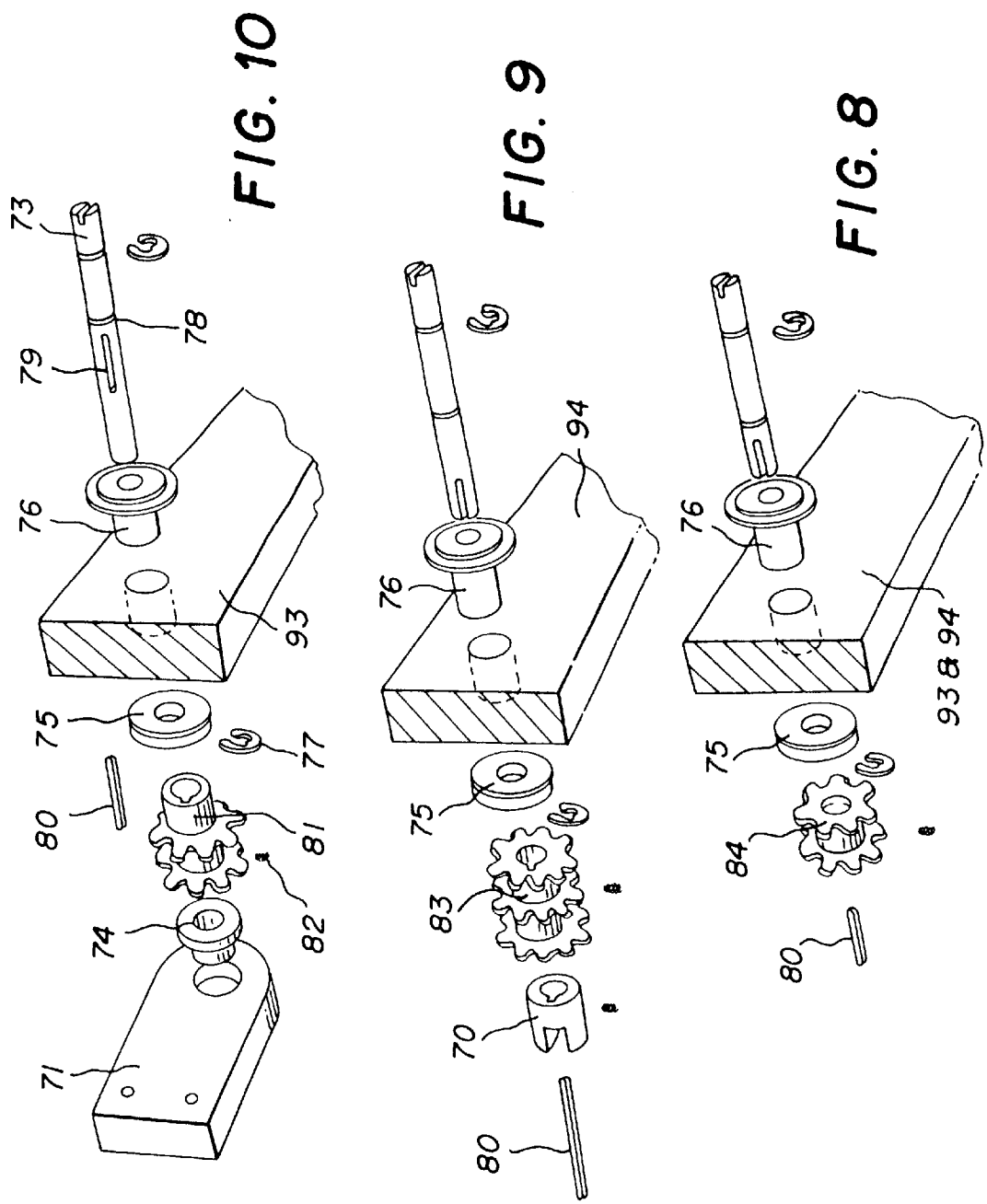

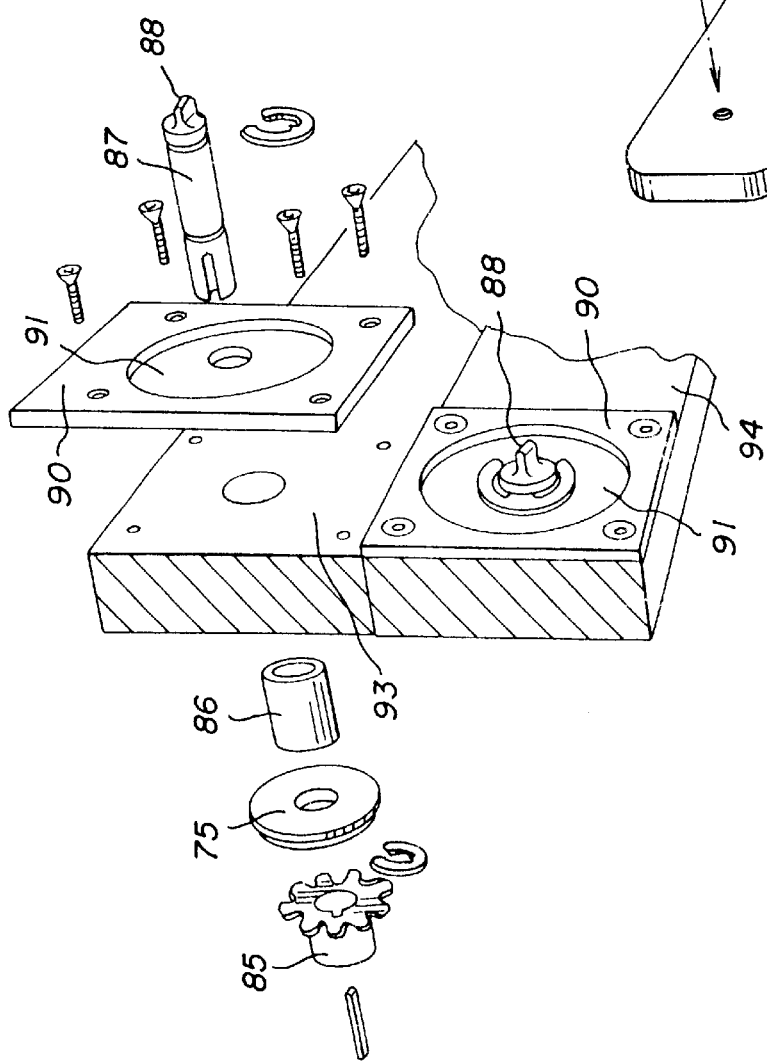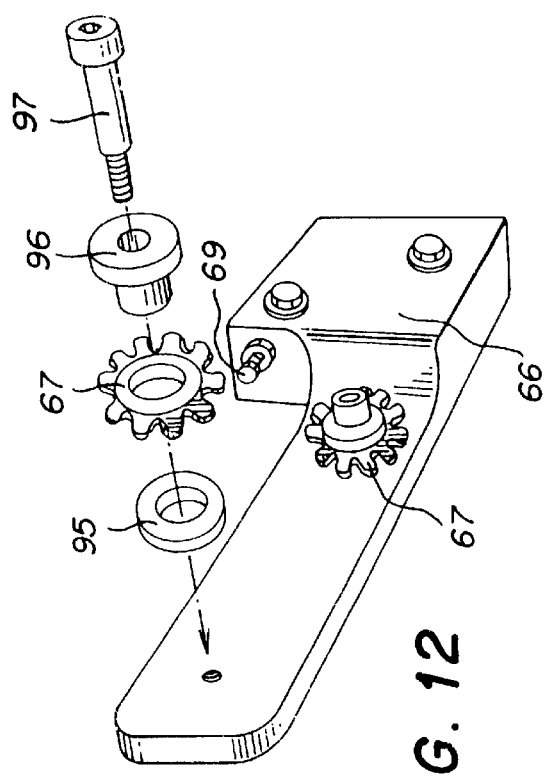

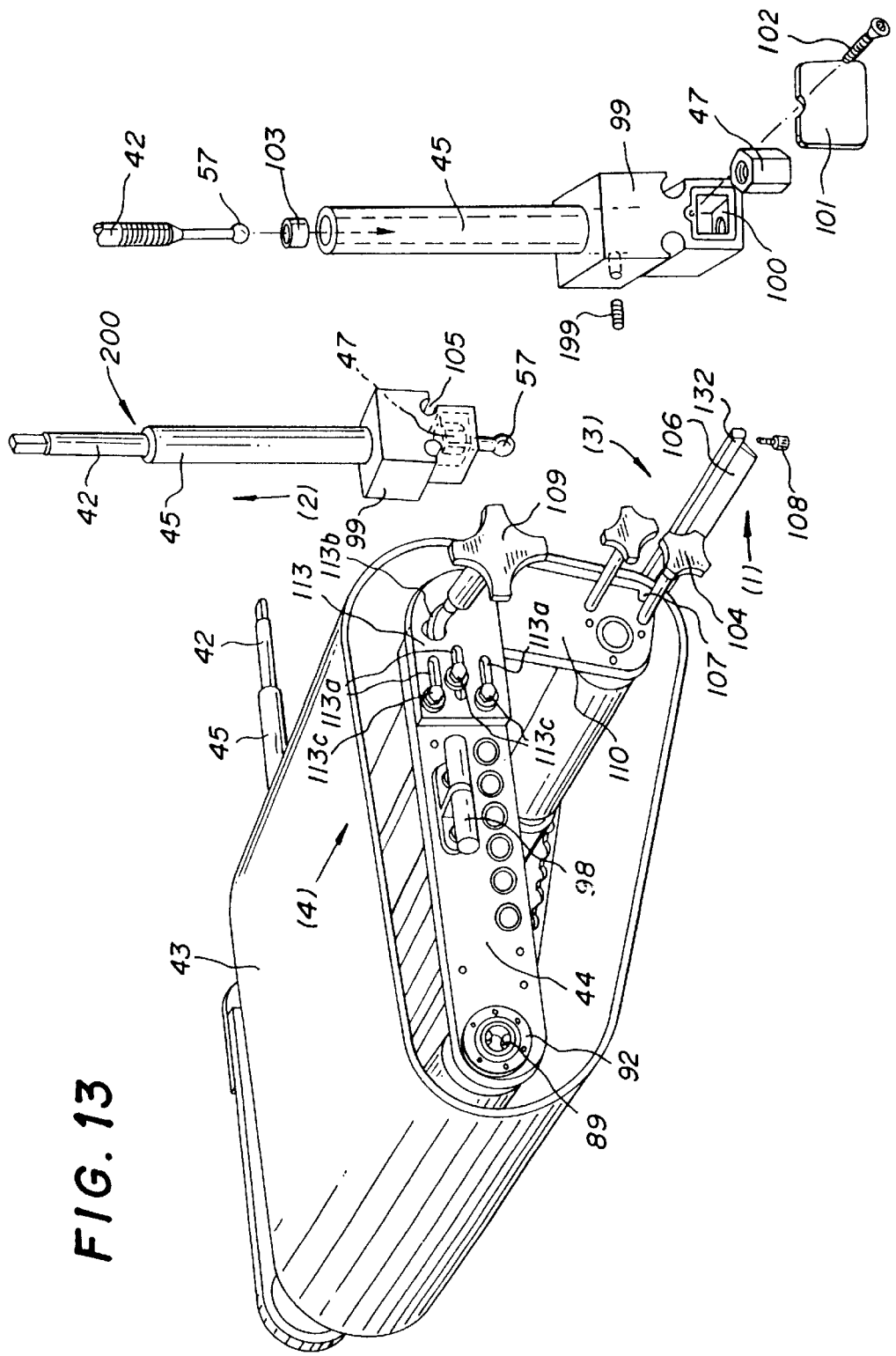

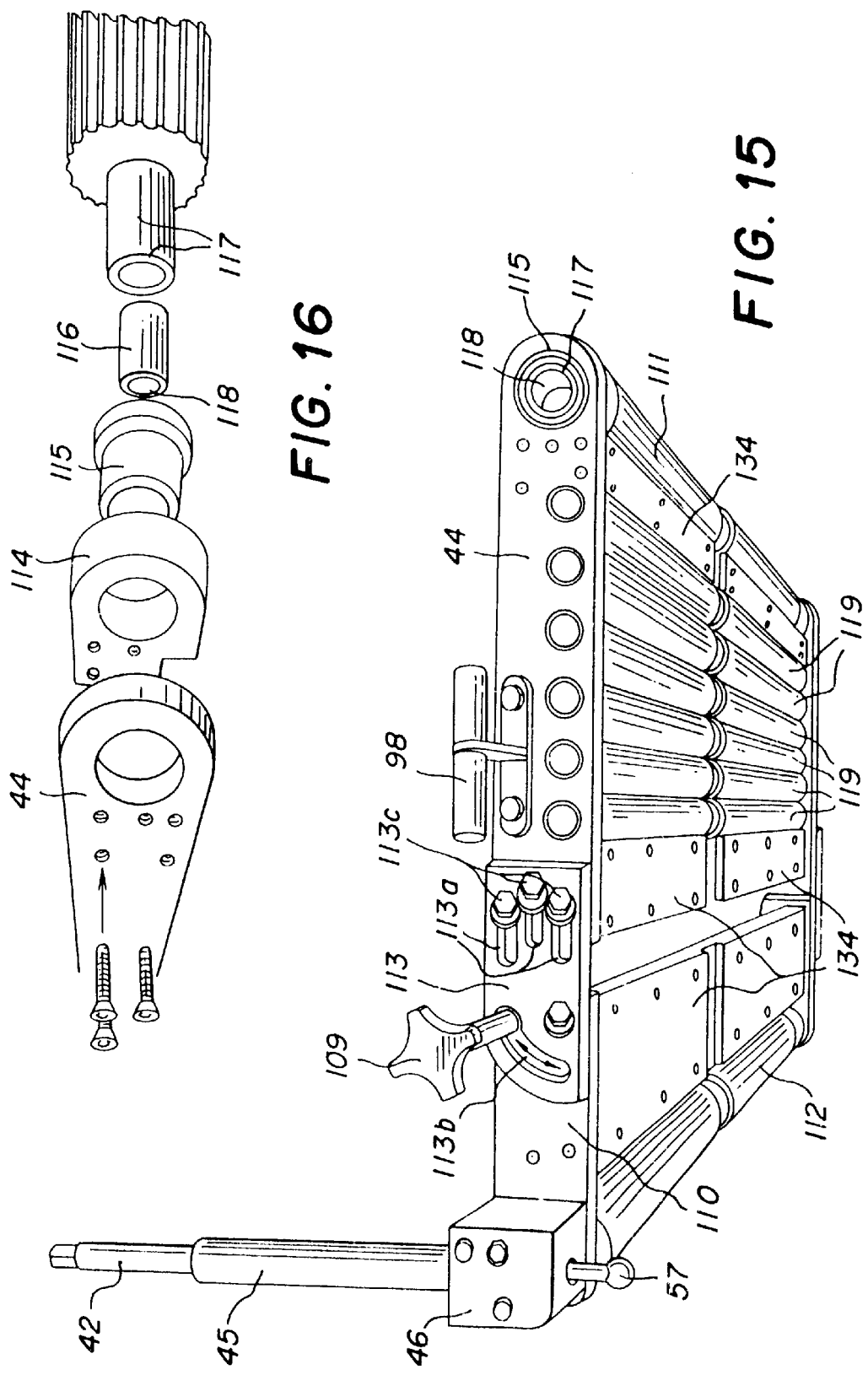

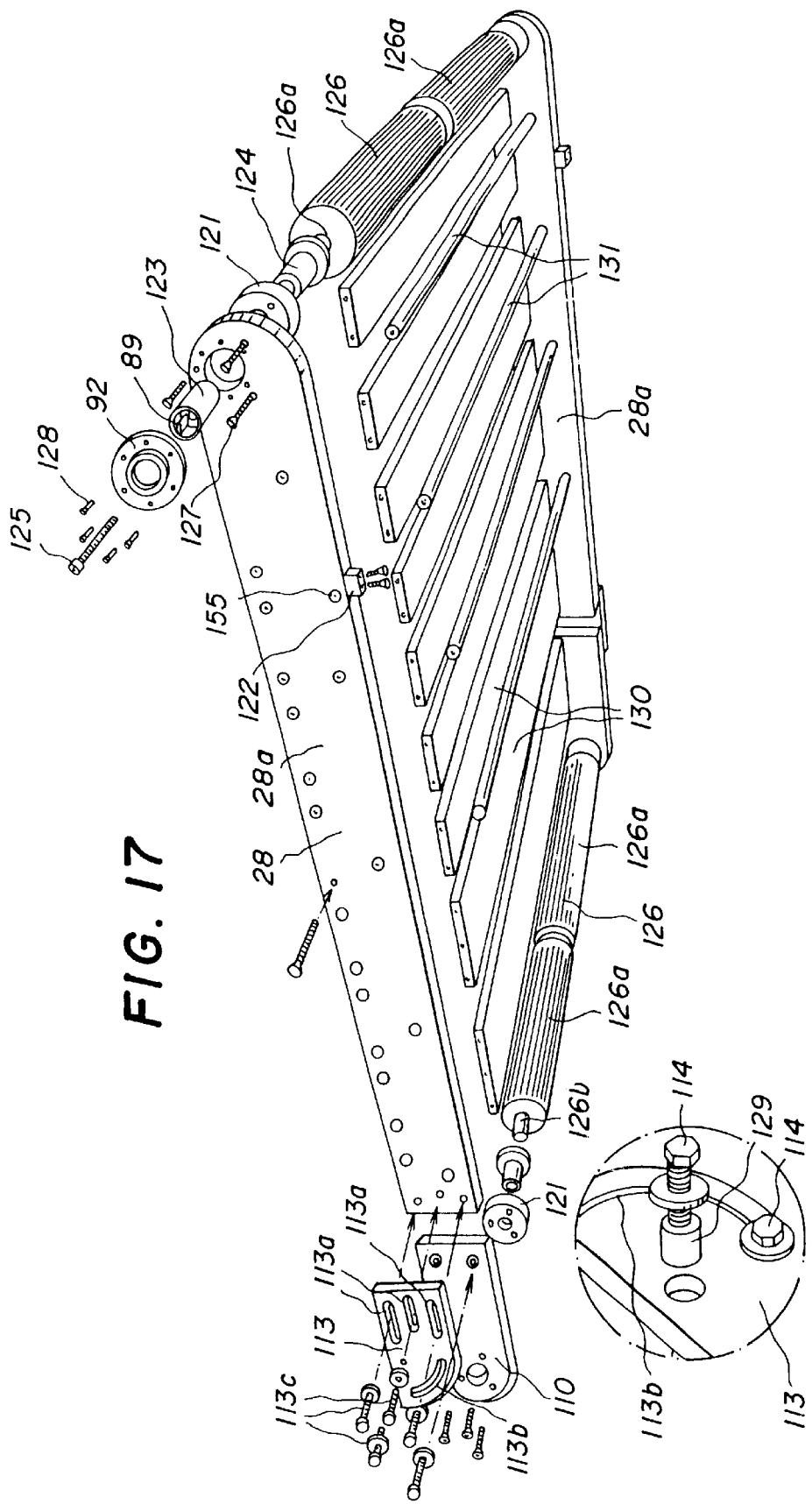

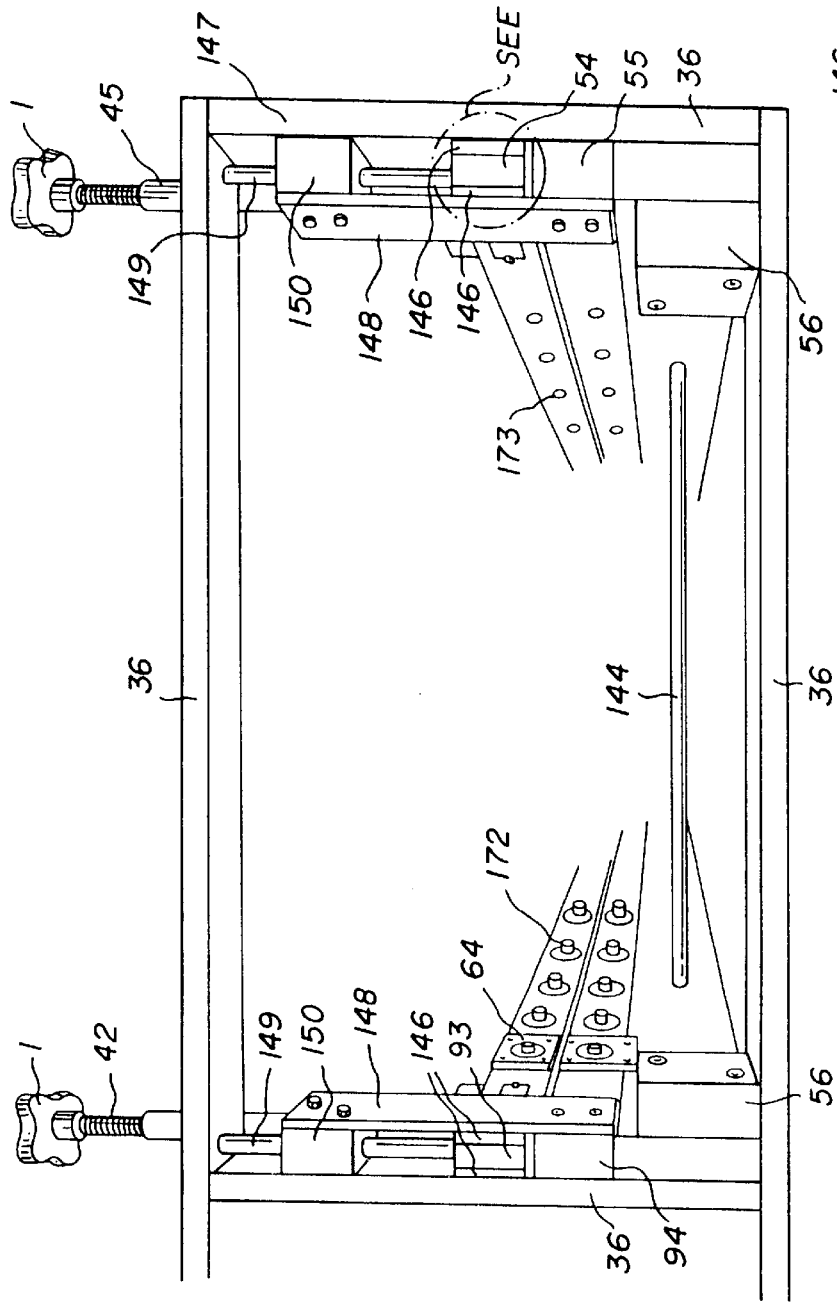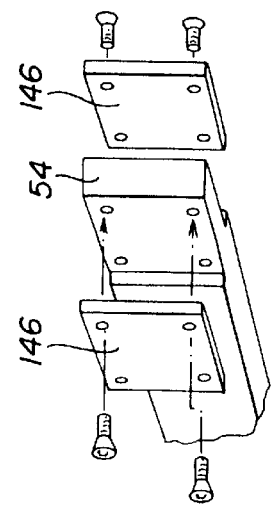

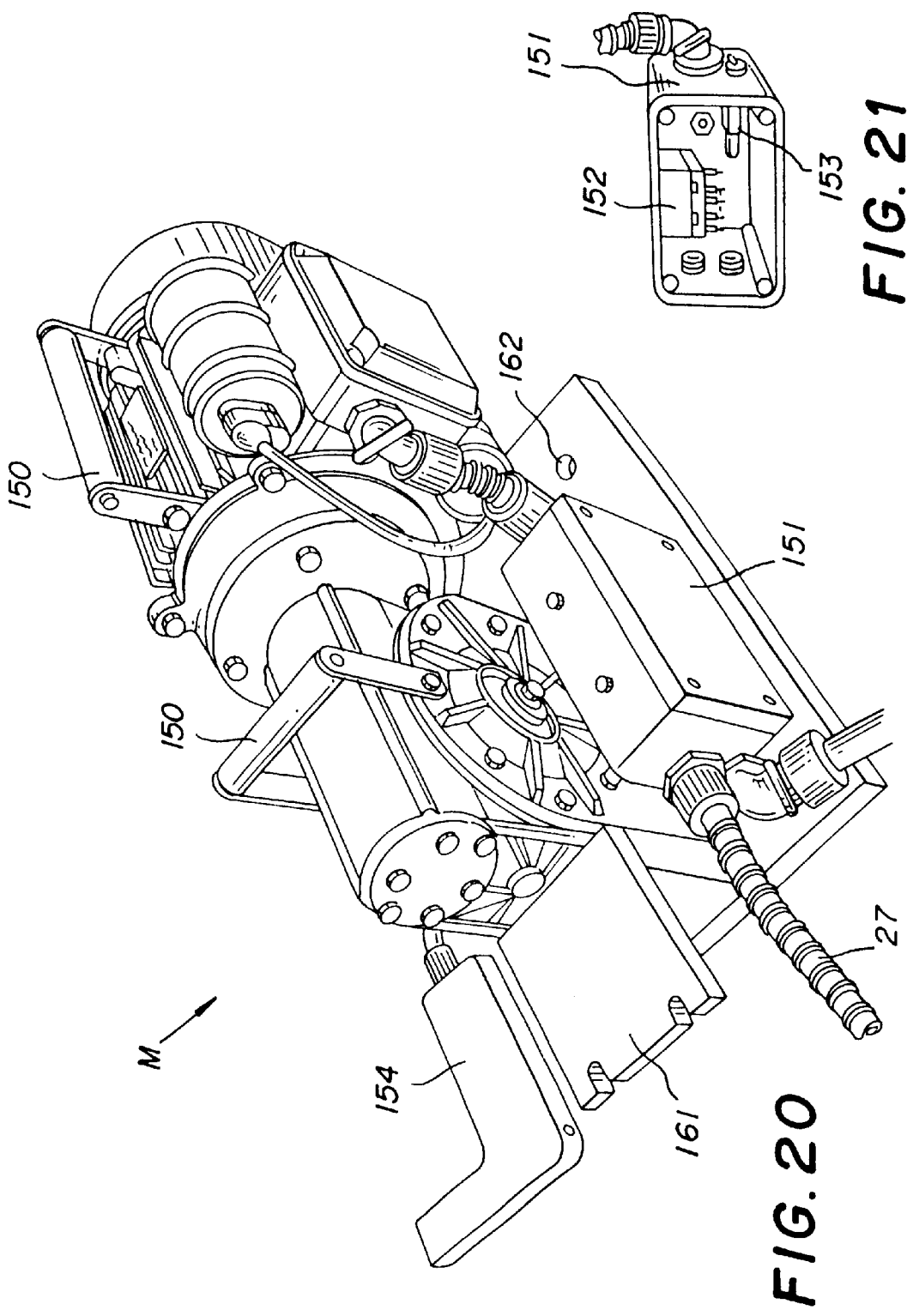

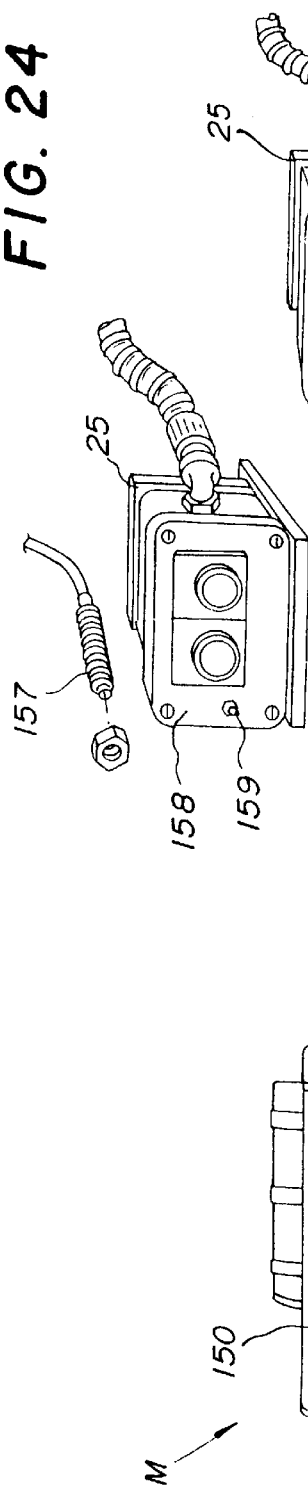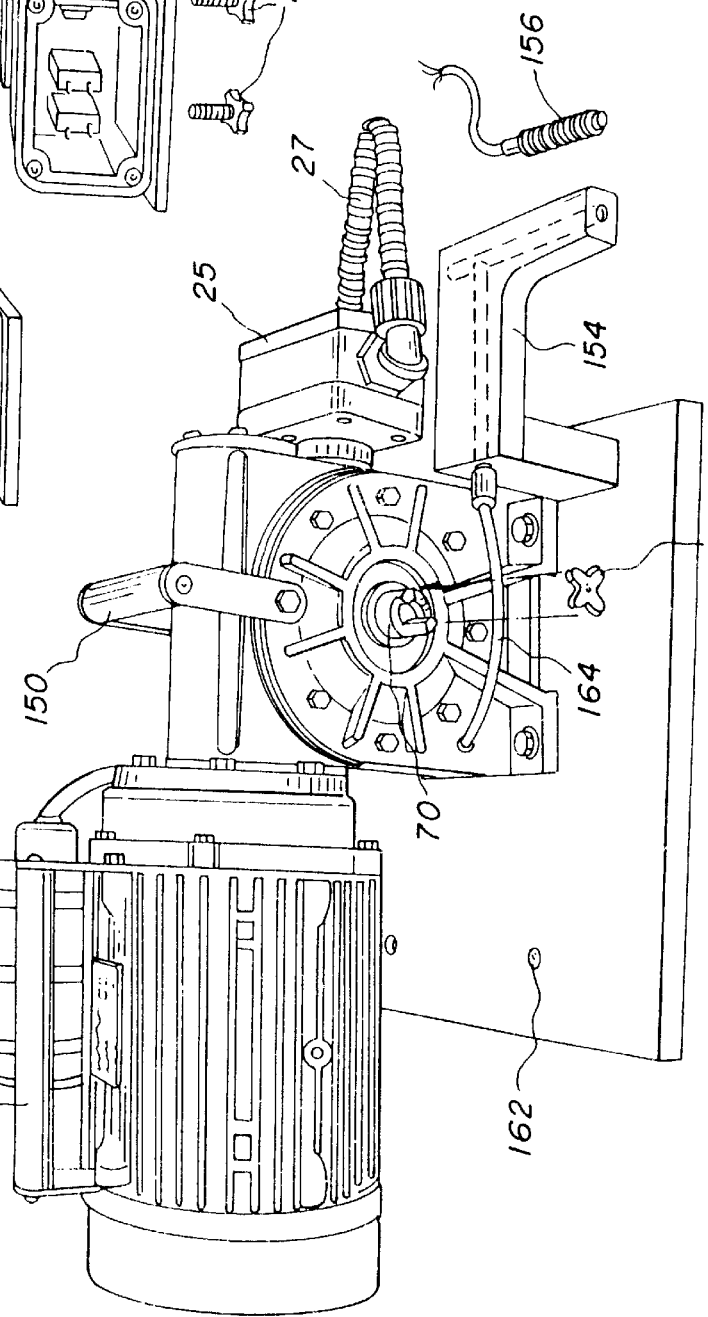
FIG. 22
FIG. 23
FIG. 24

SERIES B ROLLERS

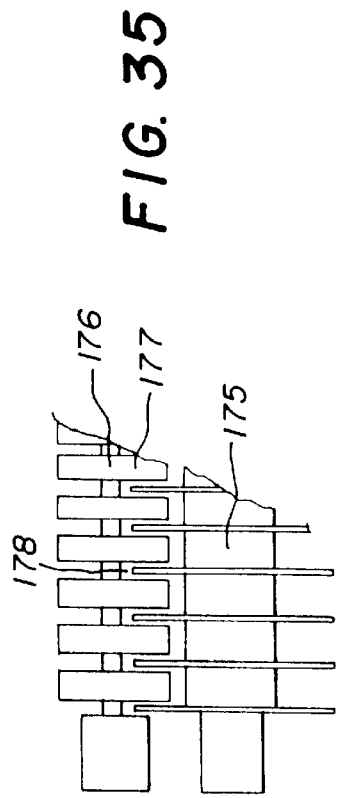
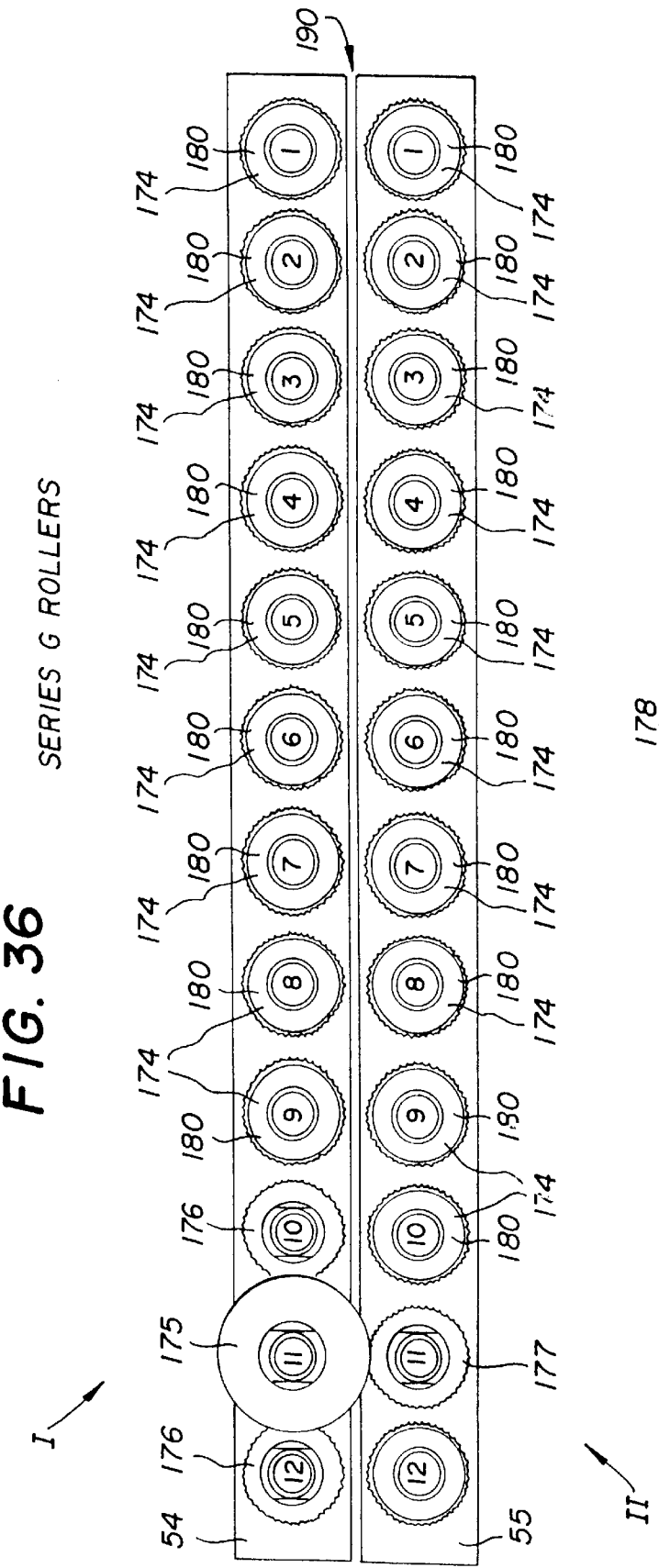

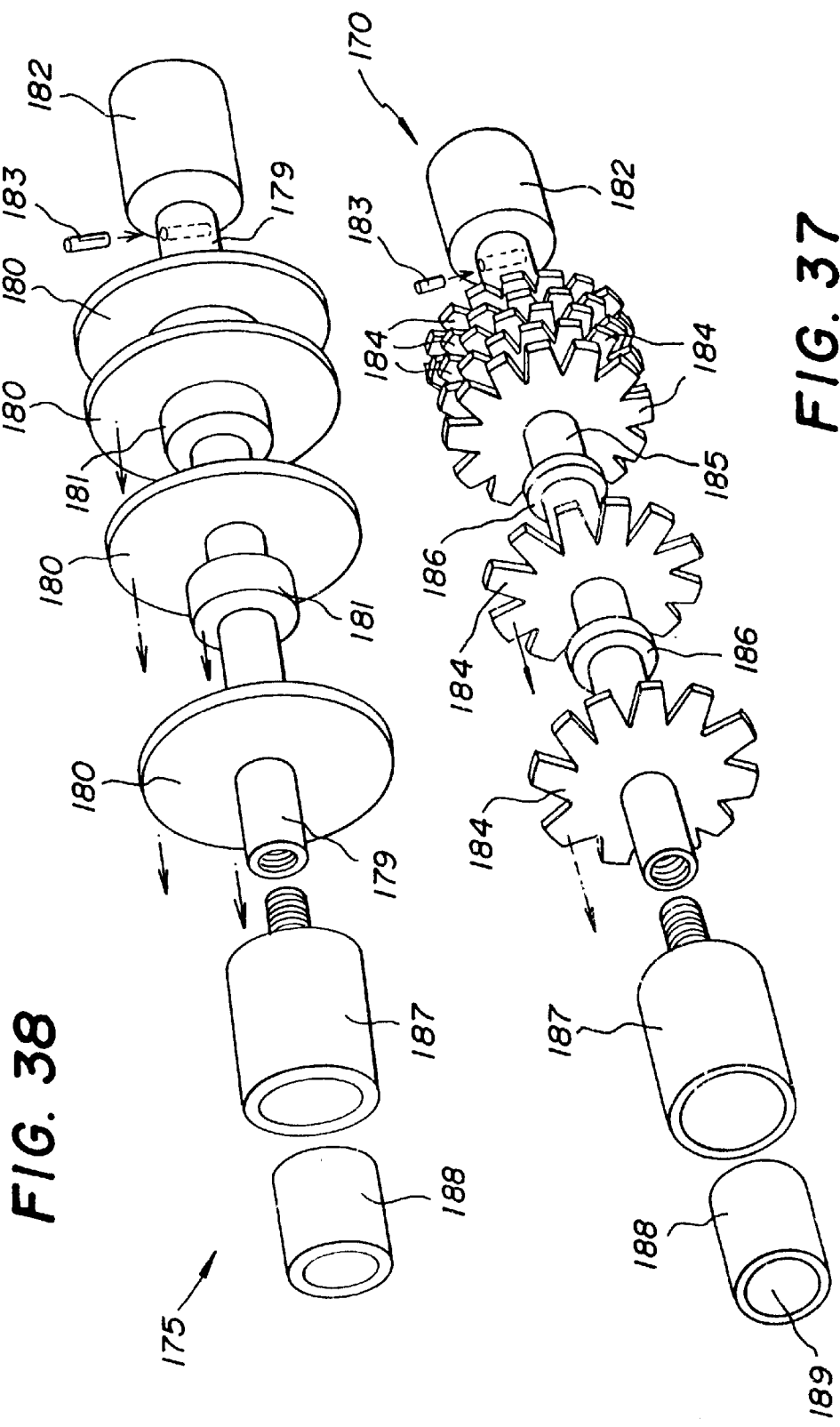

APPARATUS FOR MARINATING, TENDERIZING, STRIP CUTTING CUBE CUTTING AND PROGRESSIVELY FLATTENING MEAT

FILING HISTORY

This application is a continuation-in-part of application Ser. No. 09/246,682, filed on Feb. 8, 1999, now U.S. Pat. No. 6,257,132, which is a continuation-in-part of application Ser. No. 09/122,737, filed on Jul. 27, 1998, now abandoned.

BACKGROUND OF THE INVENTION

1. Field of the Invention

The present invention relates generally to the field of food preparation equipment. More specifically the present invention relates to an apparatus for tenderizing, progressively flattening and smoothing various meats, including but not limited to veal, poultry, beef, pork, alligator, seafood, ostrich, quail, duck, horse, lamb, goat, buffalo, venison and fish. This apparatus is an improved version of the meat flatting apparatus described in U.S. Pat. No. 5,850,786, issued on Dec. 22, 1998 to the present applicant, the contents of which are incorporated by reference.

The apparatus includes two generally parallel and adjacent rows or sets of rollers, the sets being spaced apart from each other and oriented such that the sets converge toward each other to define a gap between the sets tapering from a wider gap end to a narrower gap end for progressively flattening pieces of meat fed between the sets at the wider gap end, and includes a pair of opposing and spaced apart belts in the form of an out-feed conveyor belt assembly and an adjacent meat finishing conveyor belt assembly, both parallel to the roller sets and having receiving ends adjacent to the gap narrower end for engaging and smoothing flattened pieces of meat discharged from the gap narrower end. The sets of rollers are preferably oriented substantially horizontally to provide user access to the entire apparatus at a convenient height, but the sets may be mutually oriented at any angle relative to horizontal, and may be oriented vertically. An in-feed conveyor belt is preferably provided and is positioned to be parallel and adjacent to the gap wider end on which pieces of meat are placed and advances the pieces of meat to the gap wider end where they are engaged by and drawn between the rollers. A marinated spray device is also preferably provided at the one of the roller sets and has a sprayer nozzle directed toward the roller set to spray marinate or water onto the rollers so that the marinate or water is pressed into the meat during processing. Sprayed water serves to rehydrate the meat and is also used to keep the rollers clean from meat particles during production, and to prevent the meat itself from sticking to the rollers, and thus prevents the meat from becoming pasty.

Each set of rollers includes several mutually parallel and laterally adjacent rollers arrayed in a series from first to last which is preferably substantially rectilinear but may alternatively be curvalinear. Each set of rollers includes several flattening rollers preferably having non-sharpened protrusions about their circumfferential surfaces to knead the meat. The flattening rollers are not necessarily all identical. The teeth on the flattening rollers preferably become progressively smaller from on roller to the next as the series progresses toward the meat exit of the apparatus. Each set preferably also includes one or a group of tenderizing rollers, ahead of the flattening rollers in the series, but may also have tenderizing rollers behind or in the middle of the flattening rollers. At each end of the series of tenderizing roller is a scraper roller for dislodging and remove particles of meat caught in the tenderizing rollers. One set of rollers optionally includes a cutter roller for cutting the meat into strips or cubes, the cutter roller preferably being behind the flattening rollers in the roller series, but which may also have strip or cube cutting rollers ahead of or in the middle of the flattening rollers.

2. Description of the Prior Art

There have long been techniques for flattening meat. These have generally required the labor butchers and food preparers who have to grip the meat with their hands, leading to inherent sanitation problems. Furthermore, such manual techniques do not result in a uniform flatness which can be necessary for even cooking and consistent cooking time for all areas of the meat, and for a desired aesthetic appearance. Similar problems exist for flattening chicken, veal, pork, lamp, goat, buffalo and venison.

Attempts have been made to solve these problems, and these attempts have led to the development of the devices disclosed in U.S. Pat. No. 2,135,960, issued on Nov. 8, 1938 to Campell; U.S. Pat. No. 2,243,492, issued on May 27, 1941 to Wilson; U.S. Pat. No. 2,718,028, issued on Sep. 20, 1955 to Read, et al.; U.S. Pat. No. 3,716,893 issued on Feb. 20, 1973 to Vogelsang; and U.S. Pat. No. 4,085,482 issued on Apr. 25, 1978 to Charron, none of which actually overcame these problems. The tenderizer type machines pierce and penetrate meat and further cause the meat to be chopped into separate pieces.

The apparatus disclosed in U.S. Pat. No. 5,850,786, issued on Dec. 22, 1998 to the present applicant does overcome these problems in that the device flattens uniformly and tenderizes pieces of meat mostly without need of handling by a person. Yet it would be further desirable to provide an apparatus which additionally marinates, rehydrates, flattens and then tenderizes the meat, or which tenderizes, and then flattens and smooths the meat, or which tenderizers, flattens and strip or cube cuts and smooths the meat, or which flattens, then strip or cube cuts and smooths the meat, or which processes the meat according to various other meat roller type combinations, to further minimize the need for manual handling of the meat and to enhance processing efficiency. The roller processing of the meat changes the shape of the meat pieces, repairs damaged meat and knits two or more pieces of meat together to become one piece.

It is thus an object of the present invention to provide an apparatus for flattening meat which includes conveyor belt means for finishing the meat by smoothing the broad surfaces of the flattened meat.

It is another object of the present invention to provide such an apparatus which also includes means for applying marinate to the meat during tenderizing, flattening, strip cutting or cube cutting so that people do not have to handle the meat to perform this processing step.

It is still another object of the present invention to provide such an apparatus which also includes means for applying water to rehydrate the meat during tenderizing, flattening, strip cutting or cube cutting.

It is yet another object of the present invention to provide such an apparatus which also includes means for administering water or marinate to prevent the meat from sticking to the rollers during production.

It is a still further object of the present invention to provide such an apparatus which additionally includes an in-feed belt for increasing ease and efficiency of feeding pieces of meat into the apparatus.

It is finally an object of the present invention to provide such an apparatus which processes pieces of meat at high volume and rapidly, with minimal cost and maximum reliably.

SUMMARY OF THE INVENTION

The present invention accomplishes the above-stated objectives, as well as others, as may be determined by a fair reading and interpretation of the entire specification.

An apparatus is provided for flattening pieces of meat without piercing nor shredding the meat, the apparatus including a first roller set, each roller in the first roller set having non-sharpened outer edges; a second roller set, each roller in the second roller set having non-sharpened outer edges, the first roller set directly opposing and being spaced and fully separated from the second roller set, the first and second roller sets together having a product in-feed end into which meat pieces are drawn and having a product out-feed end at which flattened meat pieces are expelled from between the first and second roller sets; an adjustment mechanism for adjusting the spacing between the first roller set and the second roller set, where meat passing between the first and second roller sets is substantially flattened but not pierced nor shredded; and an in-feed conveyor belt assembly at the in-feed end including an in-feed conveyor belt and a rolling mechanism for rolling the in-feed conveyor belt in a direction to advance meat pieces placed on the in-feed conveyor belt to the in-feed end. The in-feed conveyor belt assembly preferably includes an in-feed conveyor frame including a pair of spaced apart and substantially parallel elongate composite frame plates including pivotally connected frame hinge segments, the frame plates being interconnected by a series of in-feed conveyor support plates over which the in-feed conveyor belt rides as it rolls and by a series of in-feed conveyor support rods, and an in-feed conveyor drive pulley extending between and rotatably mounted to the composite frame plates at the longitudinal ends of the elongate composite frame plates. The hinge segments each preferably include a belt adjuster plate bolted to an end of each of the frame plates and having an adjustment slot through which the adjuster plate mounting bolts pass and screw into ports in the given frame plate, where the slot in the belt adjuster plates permit the hinge segments to pivot to collapse the frame and move one of the conveyor drive pulleys inward generally toward the other conveyor drive pulley to release the in-feed conveyor belt, and then to move the conveyor drive pulley outward and generally away from the other drive pulley to pull taut and thereby engage the in-feed conveyor belt.

An apparatus for flattening meat without piercing nor shredding the meat is further provided, the apparatus including a first roller set, each roller having non-sharpened outer edges; a second roller set, each roller having non-sharpened outer edges, the first roller set directly opposing and being spaced and fully separated from the second roller set, the first and second roller sets together having a product in-feed end into which meat pieces are drawn and having a product out-feed end at which flattened meat pieces are expelled from between the first and second roller sets; an adjusting mechanism for adjusting the spacing between the first roller set and the second roller set, where meat passing between the first and second roller sets is substantially flattened but not pierced nor shredded; and an out-feed conveyor belt assembly at the out-feed end, including an out-feed conveyor belt and a rolling mechanism for rolling the out-feed conveyor belt in a direction to advance meat pieces placed on the out-feed conveyor belt away from the out-feed end.

The apparatus preferably additionally includes a finisher conveyor belt assembly at the out-feed end, the finisher conveyor belt assembly having a finisher conveyor belt generally parallel with, opposing and spaced apart from the out-feed conveyor belt and a rolling mechanism for rolling the out-feed conveyor belt in a direction to advance meat pieces placed on the out-feed conveyor belt away from the out-feed end; so that meat pieces expelled from between the out-feed end pass and are carried between the out-feed conveyor belt and the finisher conveyor belt by the rolling of the out-feed conveyor belt, and a finisher conveyor drive pulley drive mechanism, the finisher conveyor belt comprising a smoothing mechanism for smoothing the product.

The out-feed conveyor belt assembly preferably includes an out-feed conveyor belt and an out-feed conveyor frame including a pair of opposing spaced apart and parallel elongate out-feed frame plates and each out-feed frame plate having contiguous frame hinge segment and belt adjustor plate, the opposing frame plates and the opposing belt adjustor plates being interconnected, respectively, by a series of conveyor support plates over which the out-feed conveyor belt rolls, an out-feed conveyor drive pulley on which the out-feed belt rolls at each end of the out-feed conveyor frame, an out-feed conveyor drive pulley extending between and rotatably mounted to each end of the frame plates and to the opposing belt adjustor plate on which the conveyor belt rolls.

The finisher conveyor belt assembly preferably includes a finisher conveyor belt and a finisher conveyor frame including a pair of opposing, spaced apart and parallel elongate finisher frame plates, the finisher frame plates each having a contiguous frame hinge segment and a finisher belt adjustor plate, the opposing finisher frame plates being interconnected by a series of conveyor support plates over which the finisher conveyor belt rolls and a conveyor drive pulley extending between and rotatably mounted to the opposing frame plates and the opposing finisher belt adjuster plates on which the finisher conveyor belt rolls, and conveyor drive pulley drive mechanism.

The apparatus preferably additionally includes a marinator assembly mounted adjacent to one of the roller sets, and marinator assembly including a marinate supply mechanism and marinator nozzle oriented to spray marinate onto the rollers for delivery onto meat pieces and prevent the meat from sticking to the rollers. The apparatus preferably further includes an apparatus cover with a cover opening, where the marinator assembly includes a mounting fitting fastened to the outside of the cover and extends into and through the cover opening and has a central fitting port surrounded by a protruding and an annular flange having annular interior threads and annular flange external threaded, and a fitting fastening nut screwed onto the annular flange external threads thereby securing the mounting fitting into the cover opening and a sprayer nozzle screwed into the annular flange internal threads, the nozzle having external threads onto which a locking fitting having locking fitting internal threads is screwed, the locking fitting having a radial mounting flange protruding from its mid-section with at least one notch at its circumferential edge for receiving ends of mounting fitting fastening screws so that when the locking mount fitting is rotated the at least one notch engages and locks to the fitting fastening screws, where the locking fitting has locking nozzle external threads and where a marinate flow valve with internal threads is screwed onto the locking fitting external threads, where the flow valve has an operating lever for manually operated by a person, the marinator assembly further including a male quick release section screwed into the opposing end of the flow valve, and a marinate supply hose connector secured to the male quick release section.

The apparatus preferably additionally includes an adjustment plate adjustably mounted to each frame plate, a bracket secured to each frame plate, each bracket having a receiver block pivotally mounted to pivot into engagement with a adjustment shaft ball connecting the finisher conveyor belt assembly with the out-feed conveyor belt assembly, there enabling the adjustment shaft to move the finisher conveyor belt assembly toward and away from the out-feed conveyor belt assembly. At least one of the first roller set and the second roller set includes a tenderizing roller, a flattening roller, a scraper roller and a cutter roller.

BRIEF DESCRIPTION OF THE DRAWINGS

Various other objects, advantages, and features of the invention will become apparent to those skilled in the art from the following discussion taken in conjunction with the following drawings, in which:

FIG. 2 is a view as in FIG. 1 with the top cover partially lifted off the apparatus.

FIG. 2a is a close-up view, broken away from the apparatus shown in FIG. 2, showing a recessed pocket which is provided inside a bump guard into which a magnet is inserted and a screw which secures the magnet to the pocket.

FIG. 3 is an exploded view of the marinator device.

FIG. 4 is a view of the apparatus with the top cover entirely removed, exposing the in-feed conveyor belt assembly, the out-feed conveyor belt assembly, the finisher conveyor belt assembly, the first roller set and the motor and electrical circuit and switch.

FIG. 5 is an exploded view of the drain assembly.

FIG. 6 is a close-up view of the apparatus as show in FIG. 4, with the top cover removed.

FIG. 7 is a broken away, perspective view of the chain drive elements including the chain and various sprockets for driving the rollers.

FIG. 7a is an exploded, perspective close-up view of the drive shaft bushing block, chain drive and extra long drive shaft bushing.

FIG. 8 is an exploded, perspective close-up view of the shaft bushing, spacer, double sprocket and locking key and drive shaft fitting through a port in a rail.

FIG. 9 is a view as in FIG. 8, but showing a triple sprocket and drive coupling.

FIG. 10 is a view as in FIG. 9, additionally showing a double sprocket with hub and drive shaft bushing block.

FIG. 11 is a broken away perspective view of the permanent and adjustable drive side rails with the conveyor drive paddle shaft, conveyor mounting pad, single sprocket and related elements.

FIG. 12 is a perspective, exploded view of the block used to mount idler sprocket, idler sprockets spacer, and shaft bolt on which these elements are secured.

FIG. 13 is a perspective view of the finisher conveyor belt assembly.

FIG. 14 is an exploded view of an adjustment shaft guide tube, finisher conveyor adjustment shaft with shaft ball end, block and related elements.

FIG. 15 is a perspective view of the finisher conveyor frame, plate inserts and free spinning finisher conveyor rollers.

FIG. 16 is an exploded, perspective view of a pulley drive shaft, mounting elements and finisher conveyor frame plate.

FIG. 17 is an exploded, perspective view of the in-feed conveyor frame.

FIG. 17a is an exploded, close-up view of the belt adjuster plate, bolt and spacer.

FIG. 19 is a perspective end view of the apparatus frame, permanent and adjustable rails and roller mounting structures.

FIG. 19a is a close-up, perspective view of the adjustable rail and rub pads.

FIG. 20 is a perspective view of the motor assembly.

FIG. 21 is a perspective view of the electrical box and relay.

FIG. 22 is another perspective view of the motor assembly.

FIG. 23 is a perspective view of the removable start and stop box assembly with the box lid removed.

FIG. 24 is a perspective view as in FIG. 23 with the box lid in place on start and stop box assembly.

FIG. 35 is a partial, broken away view of intermeshing cutter blade and flattening rollers.

FIG. 36 is a side view of the permanent and adjustable rails with another of several contemplated roller combinations.

FIG. 37 is an exploded, perspective view of a tenderizing roller.

FIG. 38 is an exploded, perspective view of a cutter roller.

DETAILED DESCRIPTION OF THE PREFERRED EMBODIMENTS

Figure 1:
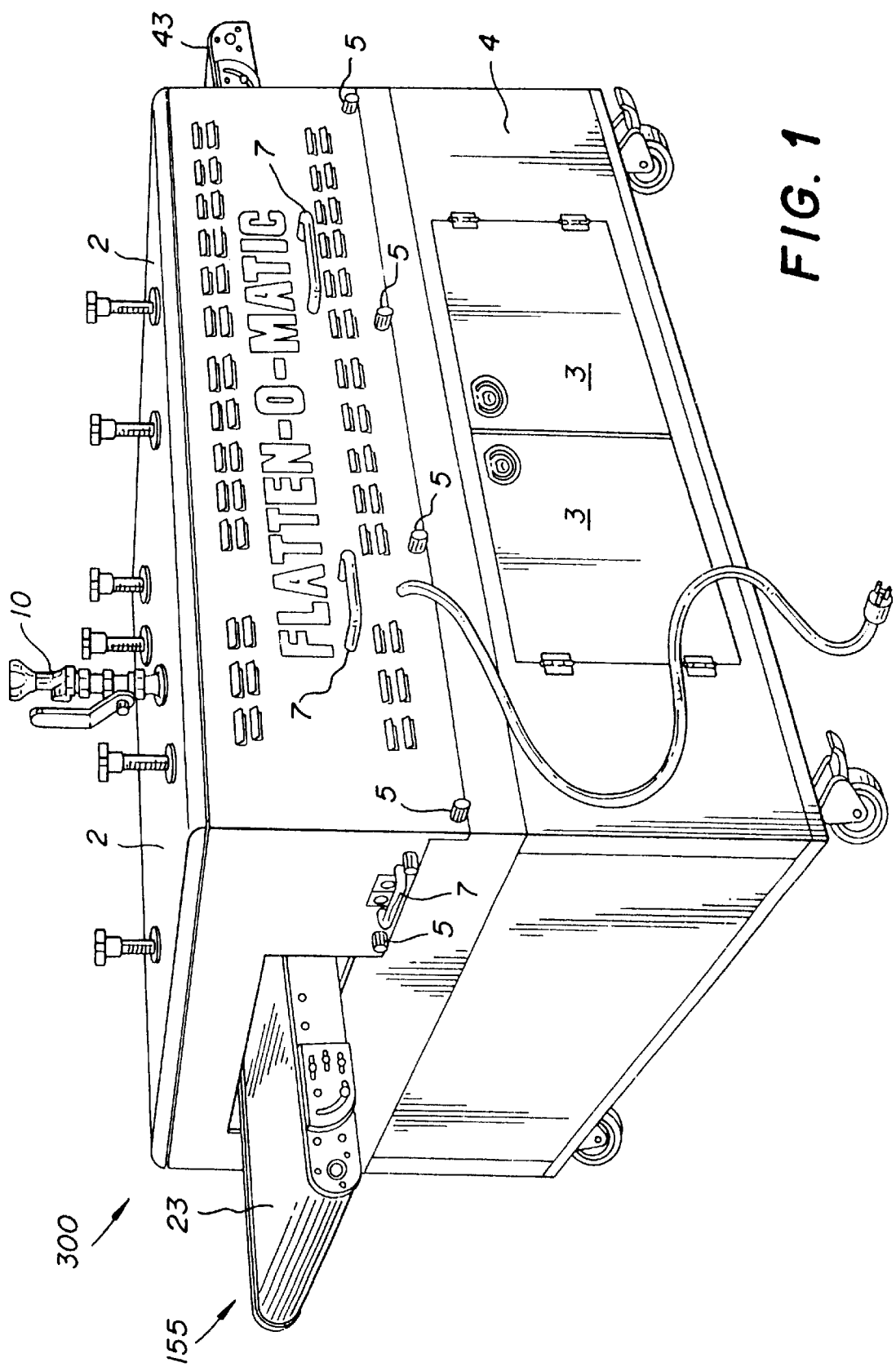
FIG. 1 is a perspective view of the entire apparatus, showing the cabinet, cabinet doors, the top cover and cover handles.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention shown in the various. Figures are designated by the same reference numerals.

First Preferred Embodiment

Referring to FIGS. 1–38, a meat processing apparatus 300 is disclosed for tenderizing, progressively flattening, strip cutting or cube cutting, marinating or rehydrating, perforating texture and smoothing various pieces of meat, including but not limited to veal, poultry, beef, pork, alligator, seafood, ostrich, quail, duck, horse, lamb, goat, buffalo, venison and fish. Apparatus 300 is an improved version of the meat flatting apparatus described in U.S. Pat. No. 5,850,786, issued on Dec. 22, 1998 to the present applicant, the contents of which are incorporated by reference.

Apparatus 300 includes two generally parallel and adjacent rows or sets I and II of rollers 169 and 174, the roller sets I and II being spaced apart from each other and oriented such that roller sets I and II converge toward each other to define a gap 190 between the sets tapering from a wider gap end to a narrower gap end for progressively flattening pieces of meat fed between the sets at the wider gap end, and includes a pair of opposing and spaced apart belts in the form of an out-feed conveyor belt assembly 40 and a meat finisher conveyor belt assembly 43, both parallel to the roller sets and having receiving ends adjacent to the gap 190 narrower end for engaging and smoothing flattened pieces of meat discharged from the gap narrower end. The roller sets I and II, as well as the individual rollers 169 and 174, are preferably oriented substantially horizontally to provide user access to the entire apparatus 300 at a convenient height, but roller sets I and II may be mutually oriented at any angle relative to horizontal, and may be oriented vertically. An in-feed conveyor belt 23 is preferably provided and is positioned to be parallel and adjacent to the gap 190 wider end on which pieces of meat are placed and advances the pieces of meat to the gap 190 wider end where they are engaged by and drawn between the roller sets I and II. A marinated spray device 10 is also preferably provided at the one of roller set I and has a nozzle 17 directed toward roller set I to spray marinate onto the rollers 174 so that the marinate is pressed into the meat during processing. Details of roller sets I and II and marinated sprayer device 10 construction are set forth in the paragraphs which follow.

Each roller set I and II includes several mutually parallel and laterally adjacent rollers 169 and 174 arrayed in a series from first to last which is preferably substantially rectilinear but may alternatively be curvalinear. Each roller set 1 and II includes several flattening rollers 174 preferably having non-sharpened protrusions about their circumferential cylindrical surfaces to knead the meat. The flattening rollers 174 are not necessarily all identical. The teeth on the flattening rollers 174 preferably become progressively smaller from on roller to the next as the series progresses toward the meat exit of the apparatus 300. Each set I and II preferably also includes one or a group of tenderizing rollers 170, preferably ahead of the flattening rollers 174 in the series. Reference numeral 201 indicates the transition point between rollers 174 and 170. The tenderizing rollers 170 selected determine the extent of penetration through the meat when tenderizing by adjusting the adjustment shafts, as well as determines penetration depth.

Each tenderizing roller 170 preferably includes a tenderizing roller axle 185 fitted with a series of non-sharpened and generally disk-shaped tenderizing blades 184, and with blade spacers 181 between the blades 184 in the form of metal rings each having a radial threaded bore for encircling the axle 170a. See FIG. 37. Each tenderizing blade 184 preferably has v-shaped notches about its circumference defining blade teeth. At each end of the series of tenderizing rollers 170 is a scraper roller 169 in the form of a solid cylinder having a scraper roller axle 169a with a series of, nonsharpened and disk-shaped circumferential integrally molded blades 169b spaced apart from each other with circumferential grooves 169b. The circumferential integrally molded blades 169b each extend at least partially between adjacent tenderizing blades 184 to dislodge and remove particles of meat caught between the tenderizing blades. Reference numeral 202 indicates the points at which blades 184 pass between blades 184. FIGS. 27–36 show various exemplary and preferred roller arrangements, which are designated as Series A–G, respectively.

One roller set I or II optionally includes a cutter roller 175 for cutting the meat into strips or cubes, including a cutter roller axle 179 fitted with a series of sharpened and disk-shaped cutter blades 180 spaced apart from each other a distance equal to the desired width of meat strips to be cut. See FIG. 38. Between the cutter blades 180 are blade spacers 181 as described above for the tenderizing rollers 170, respectively. The diameters of the cutter blades 180 are greater than the diameters of the flattening rollers 176 and 177 to extend fully across the gap 190 and thus entirely through the pieces of meat being fed through the sets of rollers. The cutter blades 175b optionally enter circumferential grooves or slots in a slotted flattening rollers 176 and 177. The cutter roller 175 optionally includes a series of longitudinal blades oriented parallel to the cutter roller axle 170a and extending between the disk shaped cutter blades 180 for cube cutting meat. A drive cap 182 is provided having external threads and which screws into internal threads of axle 185, and then is pinned onto axle 185 with a dowel pin 183. Tenderizer blades 184 slide onto axle 185 and are spaced between spacer 186 to determine the space between each of the tenderizer blades 184. Bushing cap 187 threads onto shaft 185, and roller bushing 188 presses into bushing cap 187.

Figure 34:
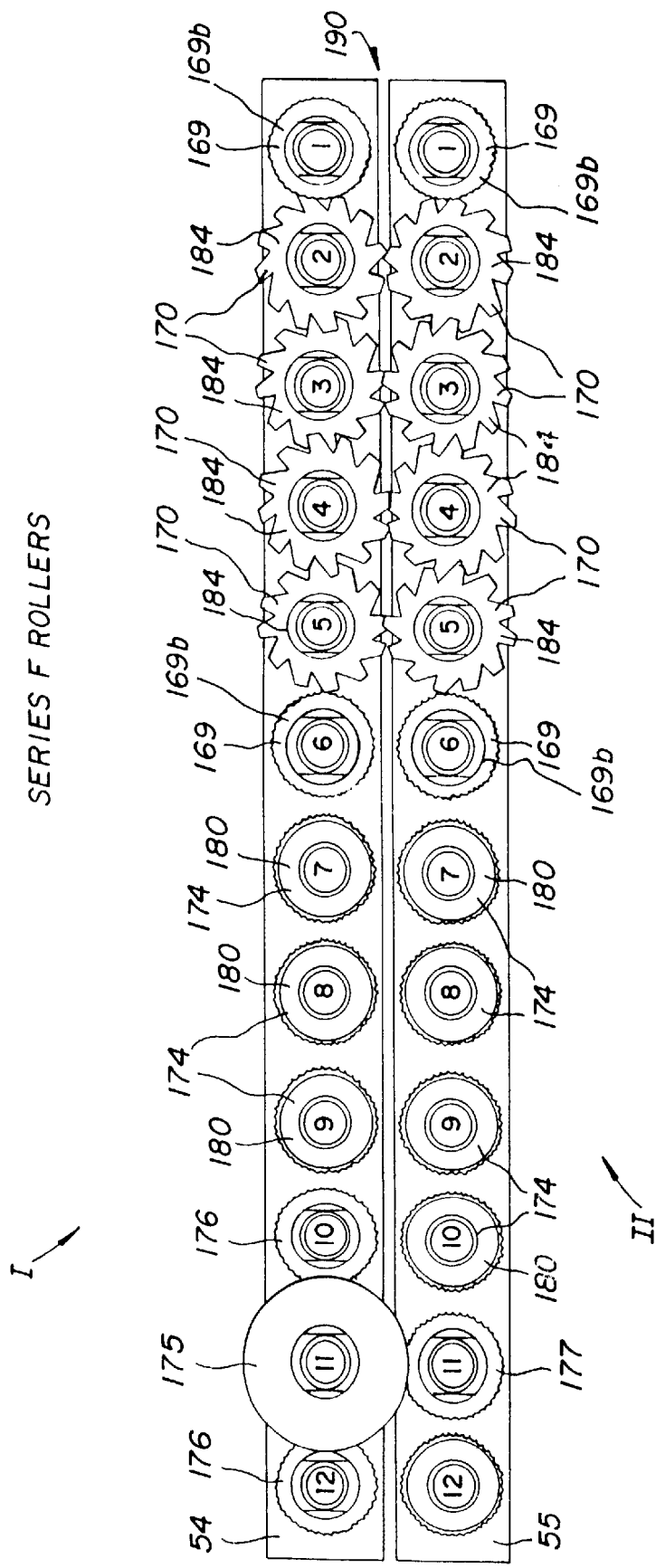
FIG. 34 is a side view of the permanent and adjustable rails with another of several contemplated roller combinations.

Referring to FIGS. 34–35, a slotted flattening roller 176 is provided having-clearance slots so that the cutter blades 176 or 177 pass into the slots in roller 176. A flattening roller 176 or 177 is provided having clearance slots in which cutter blades 180 pass into slots 177. The meat pieces pass between rollers 177 and 175, creating a shear point so that the blades on roller 175 cut complete through the meat pieces. As shown in FIGS. 37 and 38, the axle 179 in which the cutler blades 180 are installed and the spacer 181 which space the distance between cutler blades 180.

The rollers in each roller set I and II each have a mounted end and a driven end. The mounted ends have axial and protruding mounting axles (not shown) with bearing points which fit into conical mounting drive caps 171 secured in longitudinal series along a side of an adjustable rail 54. The drive cap 171 has a crosspin which is aligned with the slot on drive shaft 172. The roller driven ends each engage into a drive shaft 172 protruding axially from the rail 193 or 194 and fitted with a drive chain sprocket 172a. The drive shaft 172 ends protrude through axle ports in an adjustable drive side rail 93. Screw 53 shows how the pin shaft engages into it and twists. The idler side rail 55 and drive side rail 94 of the first set are permanently mounted to a machine frame and the adjustable idler side rail 54 and adjustable drive side rail 93 of the second set are free floating and are connected to the machine frame only by bracket guide rods 149 along which the rub pads 146 that are attached to flattening roller 193 slide up or down between machine frame 36 and guide plate 148, and adjustment shafts 42 which by their rotation advances the first rollers set I either toward or away from the second roller set II along guide rods 149. This selective movement of second roller set II relative to first roller set I permits adjustment of the extent and taper of gap 190.

The numbers 1–12 are engraved on top of rail 54. Reference numeral 192 marks the locations of other numbers engraved on the sides of the rollers which are used to install the rollers, the combined roller number matching the number on the frame adjacent the given roller for proper roller placement. Each group of rollers starting with group 1 has a slightly deeper groove than group 2. Group 2 has a slightly deeper groove than group 3. This reduction groove depth continues to the last group of flattening rollers 174, which have very shallow depth and a smaller groove profile. This is how apparatus 300 achieves progressive meat flattening with a smooth natural texture. More pressure is applied to the meat as it passes between each group of flattening rollers 193 and is reduced in thickness. The meat then passes underneath the finisher conveyor belt 43 and presses against the out-feed conveyor belt 40a producing a smooth tightly knitted product that looks natural. The finisher conveyor belt assembly 43 is adjusted up or down by the two adjustment shafts 42 to control the pressure applied to the meat pieces.

Apparatus 300 includes machine frame 36 having horizontal and vertical frame structural members 36a and frame feet 37 extending downwardly from the rest of frame 36 mounted to the inside of the cabinet on which apparatus 300 stands. Frame 36 includes a conveyor support frame 39 in which the out-feed conveyor belt assembly 40 rests when it is installed. A support rod 144 interconnects adjustable idler side rails to support a catch tray 145. A rub pad 146 is mounted to adjustable rail 54 and slides between a side frame 147 and a guide plate 148. Support guide rod 149 is mounted through adjustable idler side rail 54 and into permanent rail 55 through spacer block 150. A cradle bracket 165 is positioned on top of rail 94 and rail 55, and cradle 166 is placed on top of cradle bracket 165 so that cradle bracket 165 tips of the cradle 167 and rests on bracket 165. After bracket 165 and cradle 166 are installed several optional rollers 168 and 169 are placed in the cradle 166. After brackets 165, 166 and 168 are installed, cap 171 is aligned with drive shaft 172. Then cradle 166 is pushed towards the drive shaft 172 and roller installation pin 52 is fitted through hole 173 into tenderizing roller bushing 188.

The in-feed conveyor belt assembly 155 preferably includes an in-feed conveyor belt 23, a pair of spaced apart and parallel elongate plates 28a and contiguous frame hinge segments 110, together defining the in-feed conveyor frame 28. See FIGS. 2, 4 and 17. The frame plates 28a are interconnected by a series of conveyor support plates 130 over which the in feed conveyor belt 23 rides and by a series of support rods 131. A conveyor scraper blade 106 mounts onto a bracket 132. Finisher conveyor rollers 119 and out-feed conveyor rollers 120 rotate within bushing 133. A conveyor drive pulley 126 on which the belt 23 rolls is provided at each end of frame 28. Conveyor pulleys 126 each extend between and are rotatably mounted to the frame plate 28a, each pulley 126a has an axle pressed into both ends 126b which protrudes from the remote longitudinal ends of the pulley 126a. Drive pulley 126c has traction grooves on it which grip the conveyor belt for positive traction. A conveyor bushing 124 is fitted onto each of these protruding axle 126b ends, and an annular conveyor bearing spacer 121 fits over each conveyor bushing 124. The portions of conveyor bushings 124 protruding through conveyor bushings 124 extend into. bushing ports in frame plates 28a and hinge sections 110. A conveyor drive pin 89 fits inside coupling 123 protruding ends and an annular mounting pad 92 fits around each conveyor drive coupling 123 and is screwed to the frame plate 28a with screws 128. An axial screw 125 screws into the outer end of each conveyor drive coupling 123 to retain the conveyor drive coupling 123 onto the drive pulley. Conveyor bearing spacer 121 is secured to frame plate 28 by the screws 127. The hinge segments 110 each include a belt adjuster plate 113 bolted to the hinge segment 110 outer face which has three longitudinal adjustment slots 113a and a curved adjustment slot 113b through which the plate 113 mounting bolts 113c pass and screw into ports in the given hinge segment 110. Slots 113a and 113b in belt adjuster plates 113 permit hinge segments 110 to pivot to collapse the frame 28 and move one of the conveyor drive pulleys 126 inward to release a worn out belt 23 and to move the conveyor drive pulleys 126 back outward to engage a fresh belt 23.

A spacer bushing 129 is provided which permits bolts 114 to be tightened without bolt tightening 113 onto 110 enabling 110 to hinge upward releasing the conveyor belt 23. Spacer bushing 129 mounts through each belt adjuster plate 113 thereby enabling hinge segments 110 to swivel freely up and down when bolts 114 are tightened. A conveyor bump 122 protrudes downwardly from one of the frame plates 28a and serves to align the conveyor drive by pushing the conveyor drive in until it hits the bump stops 122 on the machine frame 36 and then slides the in-feed conveyor belt assembly 155 into the drive, engaging circular mounting pad 92 into conveyor mounting pad 90. A conveyor drive block 123 rotates inside conveyor bushing 124. Screws 127 are fitted into conveyor bearing spacer 121 and hold spacer 121 firmly onto in-feed conveyor frame 28. Screws 128 hold circular mounting pad 92 firmly onto in-feed conveyor frame 28.

Figure 18:
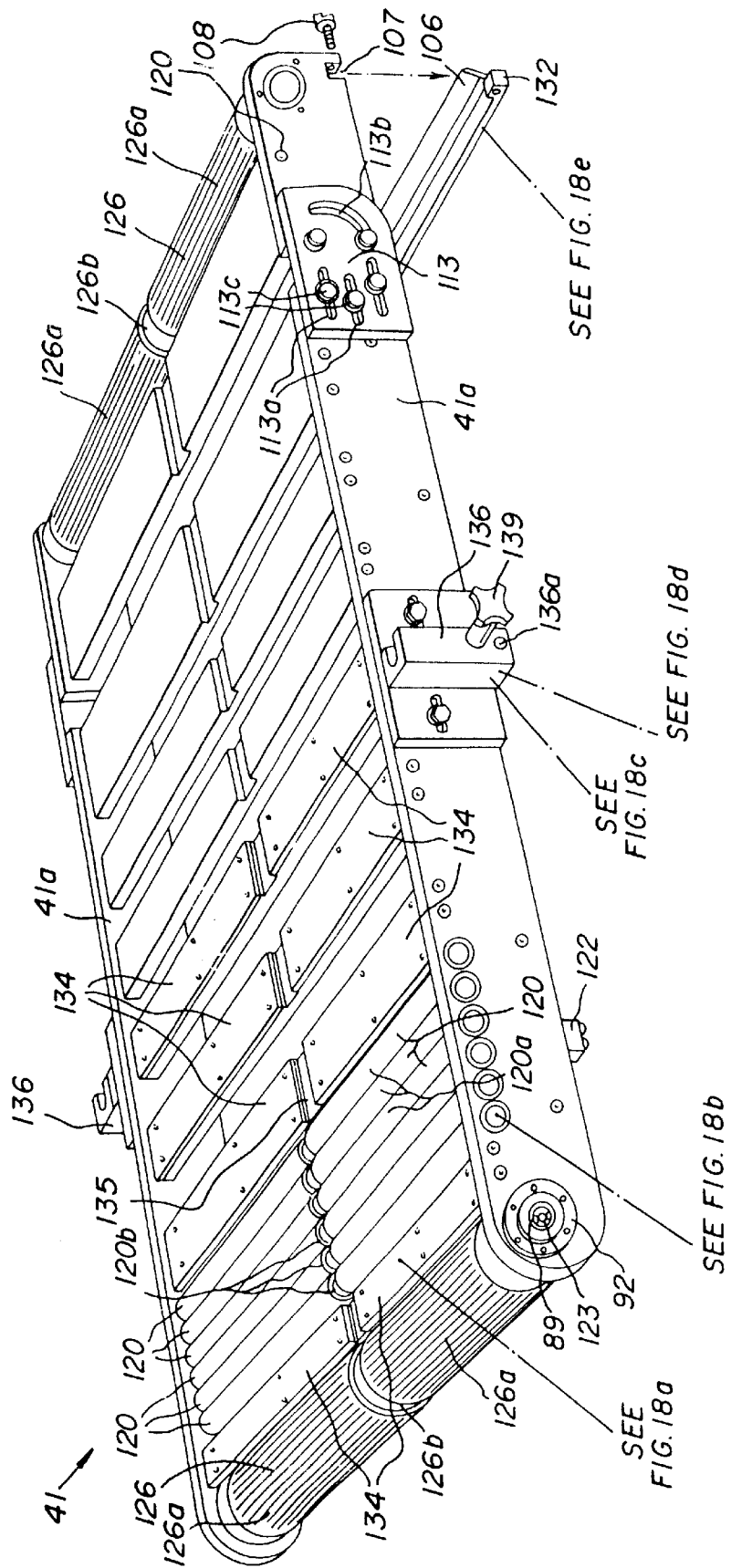
FIG. 18 is a perspective view of the out-feed conveyor frame, rollers and plate inserts.
Figure 18A:
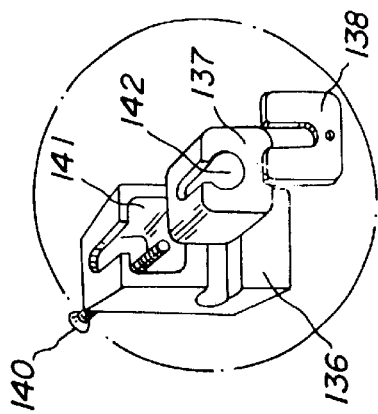
FIG. 18a is broken away close-up perspective view of the plate inserts and aluminum support plate.
Figure 18B:
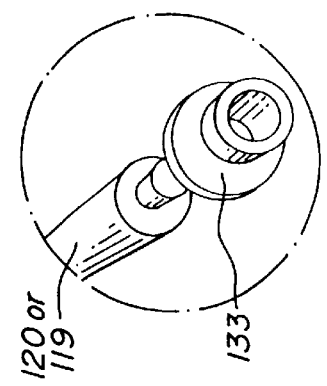
FIG. 18b is a broken away, close-up perspective view of a bushing and exit conveyor roller.

The out-feed conveyor belt assembly 40 preferably includes an out-feed conveyor frame 41 made up of a pair of spaced apart and parallel elongate frame plates 41a and contiguous frame hinge segments 110 and belt adjustor plates 113. See FIGS. 5 and 18–18e. The frame plates 41a are interconnected by a series of conveyor support plates 134 over which the out-feed conveyor belt 40a rides. A conveyor drive pulley 126 on which the belt 40a rides is provided at each end of frame 41. Conveyor drive pulleys 126 each extend between and are rotatably mounted to the frame plates 41a, each including two drive pulley cylinders 126a mounted on a drive pulley shaft 126b which protrudes from the remote longitudinal ends of the drive pulley cylinders 126a.

At one end of the frame 41 adjacent to one of the conveyor drive pulleys 126 are a series of preferably six out-feed conveyor rollers 120, which extend between and are rotatably mounted to conveyor frame plates 41a. Each conveyor roller 120 includes a cylindrical roller body 120a with a reduced diameter mounting segment 120b at each longitudinal end and a bushing 133 fitted over each mounting segment 120b which fits into a roller port in a frame plate 41a. Out-feed conveyor rollers 120 rollingly support the conveyor belt 40a. Between the group of conveyor rollers 120 and the drive pulley 126 at the opposing end of frame 41 are a longitudinal series of aluminum support plates 135 extending between and secured with fasteners to corresponding opposing points on conveyor frame plates 41a. Two stainless steel plate inserts 134 cover the upper surfaces of the aluminum support plate 135 ends, leaving a gap between the plate inserts 134. See FIG. 18a. Stainless steel plate inserts 134 function to prevent excessive wear of aluminum parts. Meat pieces pass between the two opposing conveyor belts 40a and 41a they press the belt 40a against the plate inserts 134.

As described above, the hinge segments 110 each include a belt adjuster plate 113 bolted to the hinge segment 110 outer face which has three longitudinal adjustment slots 113a and a curved adjustment slot 113b through which the plate 113 mounting bolts 113c pass and screw into ports in the given hinge segment 110. Slots 113a and 113b in belt adjuster plates 113 permit hinge segments 110 to pivot to collapse the frame 41 and move one of the conveyor drive pulleys 126 inward to release a worn out belt 40a and to move the conveyor drive pulleys 126 back outward to engage a fresh belt 40a.

A notch 107 is provided in the lower edge of an end of each frame plate 41a into which a conveyor scraper bracket 106 mounts onto frame plates 41a. See FIGS. 18 and 18e. A threaded end of a conveyor scraper knob 108 is screwed into a set screw port in the end of each frame plate 41a adjacent to the notch 107 to enter the notch 107, so that scraper knob 108 can be screwed into engaging contact with scraper bracket 106 and thereby function as a set screw.

Figure 18C:
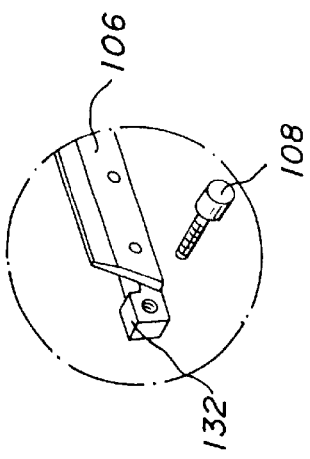
FIG. 18c is an exploded, perspective view of the bracket that hinges upward to connect onto the adjustment shaft ball to connect the finisher conveyor and the out-feed conveyor, and related elements.
Figure 18D:
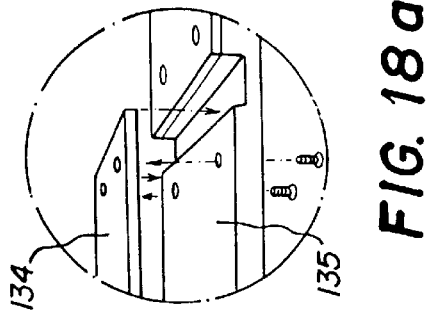
FIG. 18d is perspective, close-up view of the bracket that hinges upward to connect onto the adjustment shaft ball.
Figure 18E:
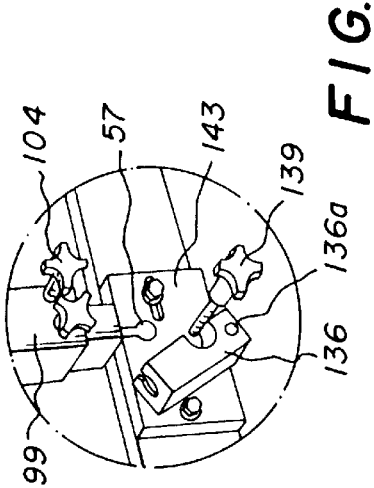
FIG. 18e is a perspective, close-up view of the conveyor scraper and scraper bracket.
Figure 25:
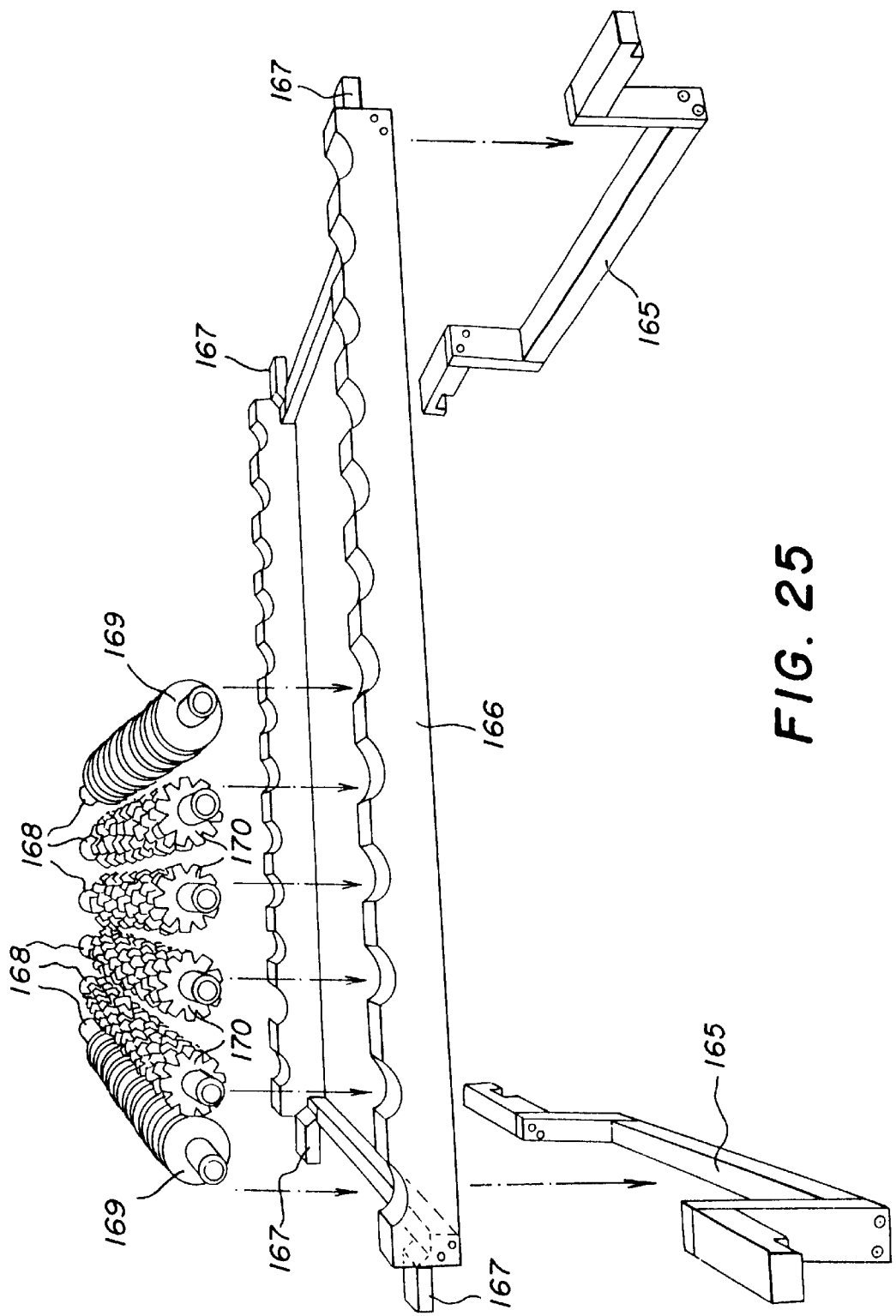
FIG. 25 is a perspective view of the roller cradles and cradle brackets, and six of the rollers positioned for placement into the roller cradles.
Figure 26:
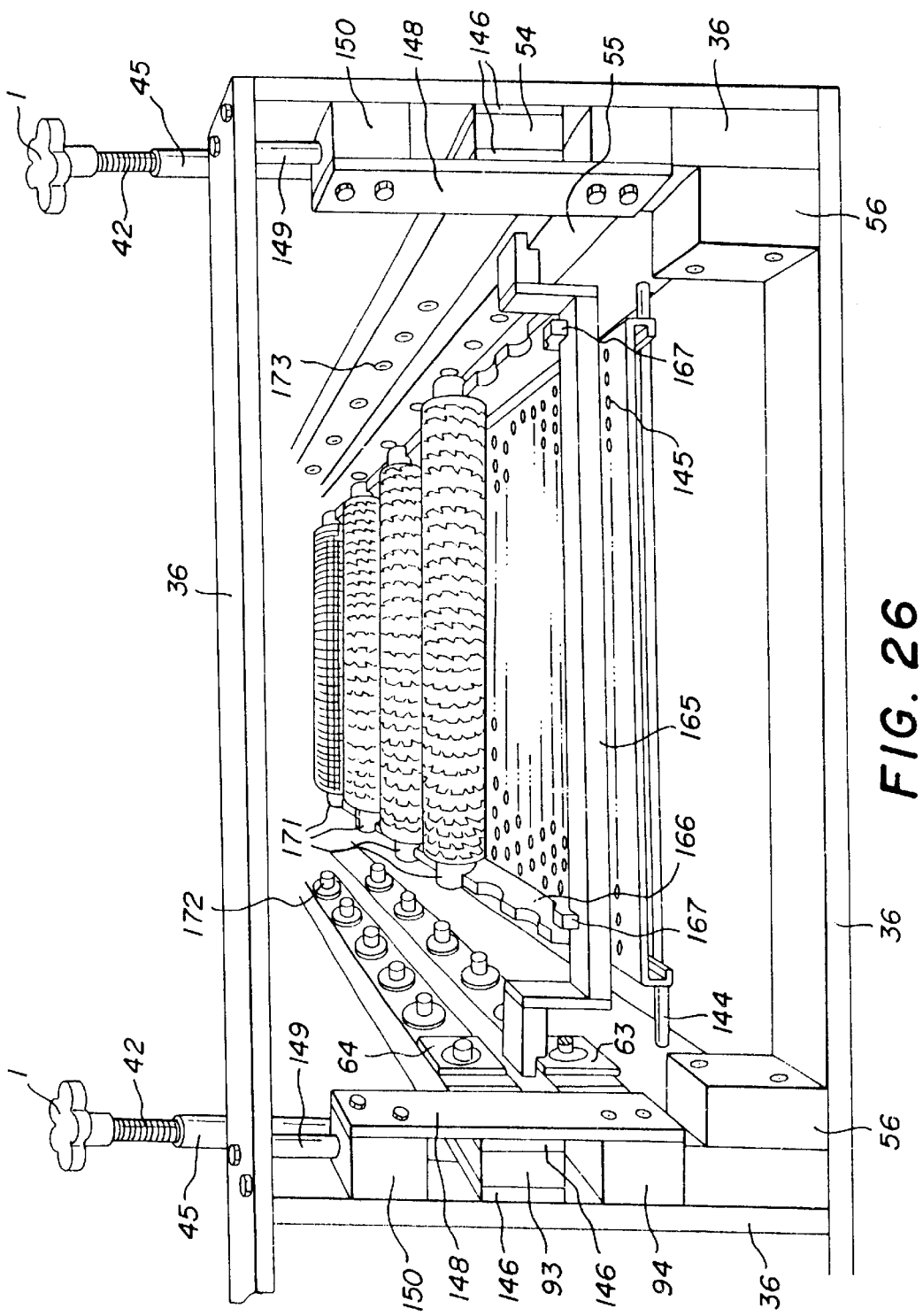
FIG. 26 is a view as in FIG. 19, with the roller cradles and several rollers fitted into place on the cradle brackets.
Figure 27:
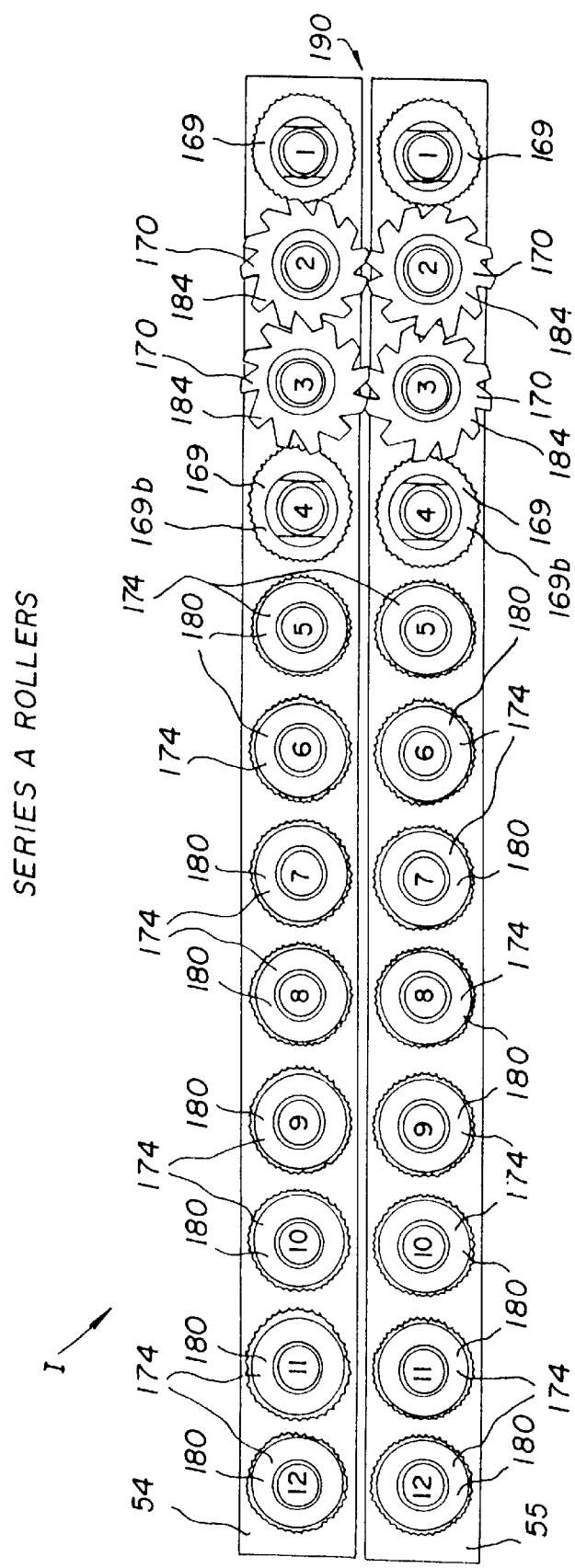
FIG. 27 is a side view of the permanent and adjustable rails with one of several contemplated roller combinations.
Figure 28:
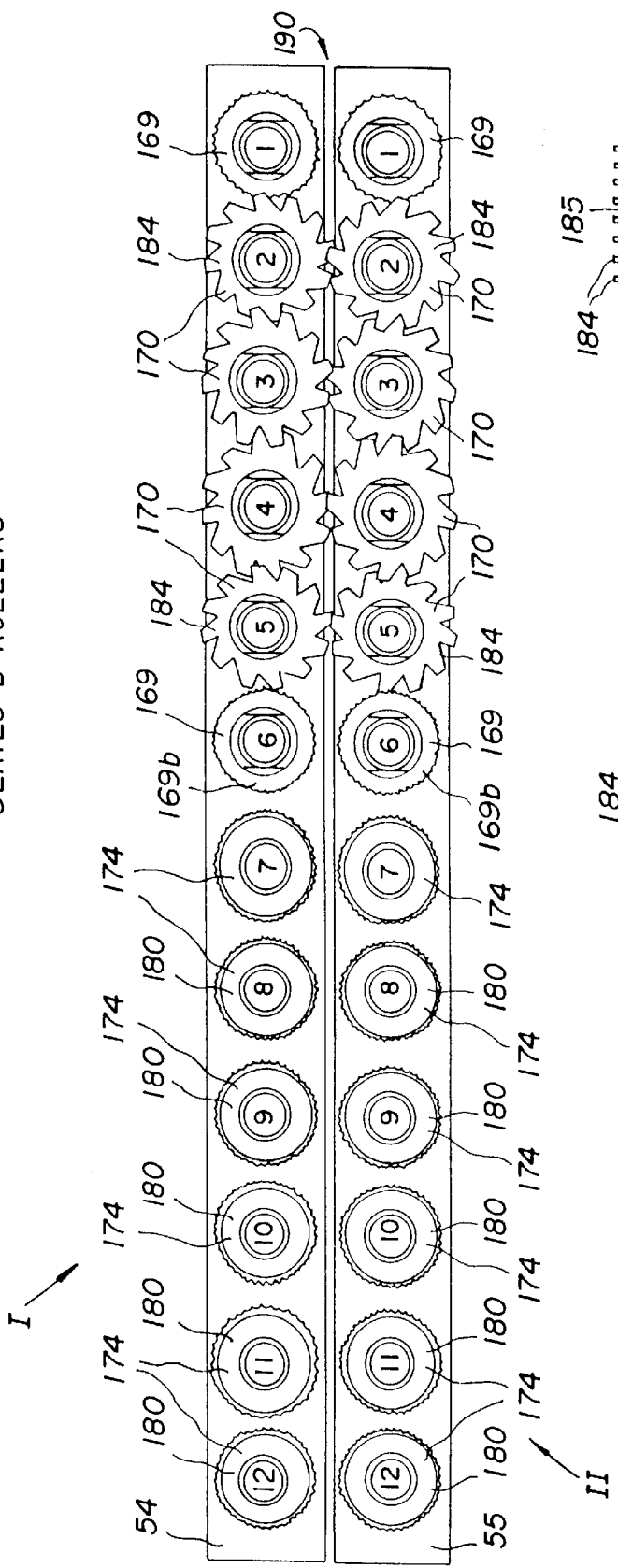
FIG. 28 is a side view of the permanent and adjustable rails with one of several contemplated roller combinations.
Figure 30:
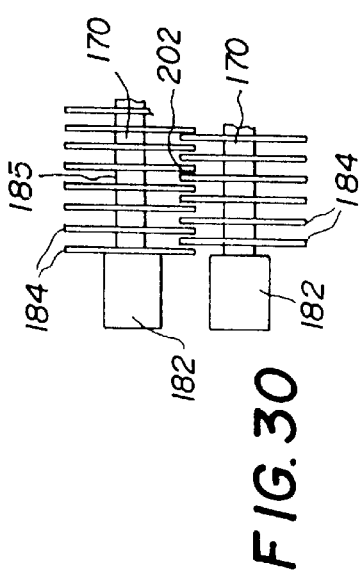
FIG. 30 is a partial, broken away view of intermeshing tenderizing rollers.
Figure 29:
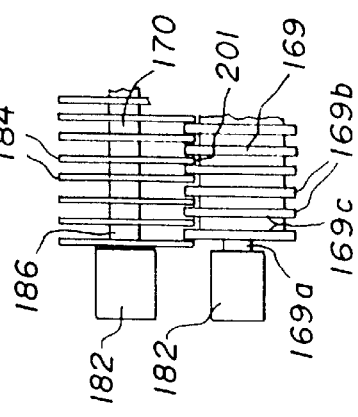
FIG. 29 is a partial, broken away view of intermeshing scraper and tenderizing rollers.
Figure 31:
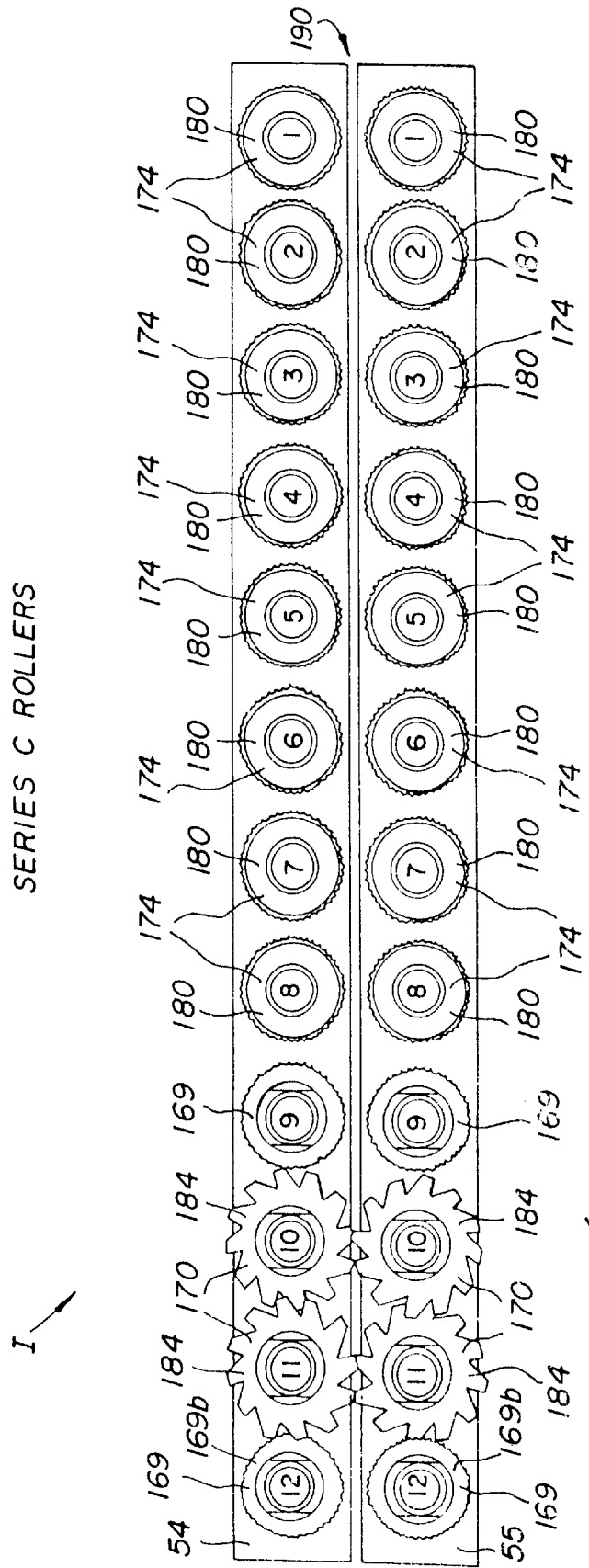
FIG. 31 is a side view of the permanent and adjustable rails with another of several contemplated roller combinations.
Figure 32:
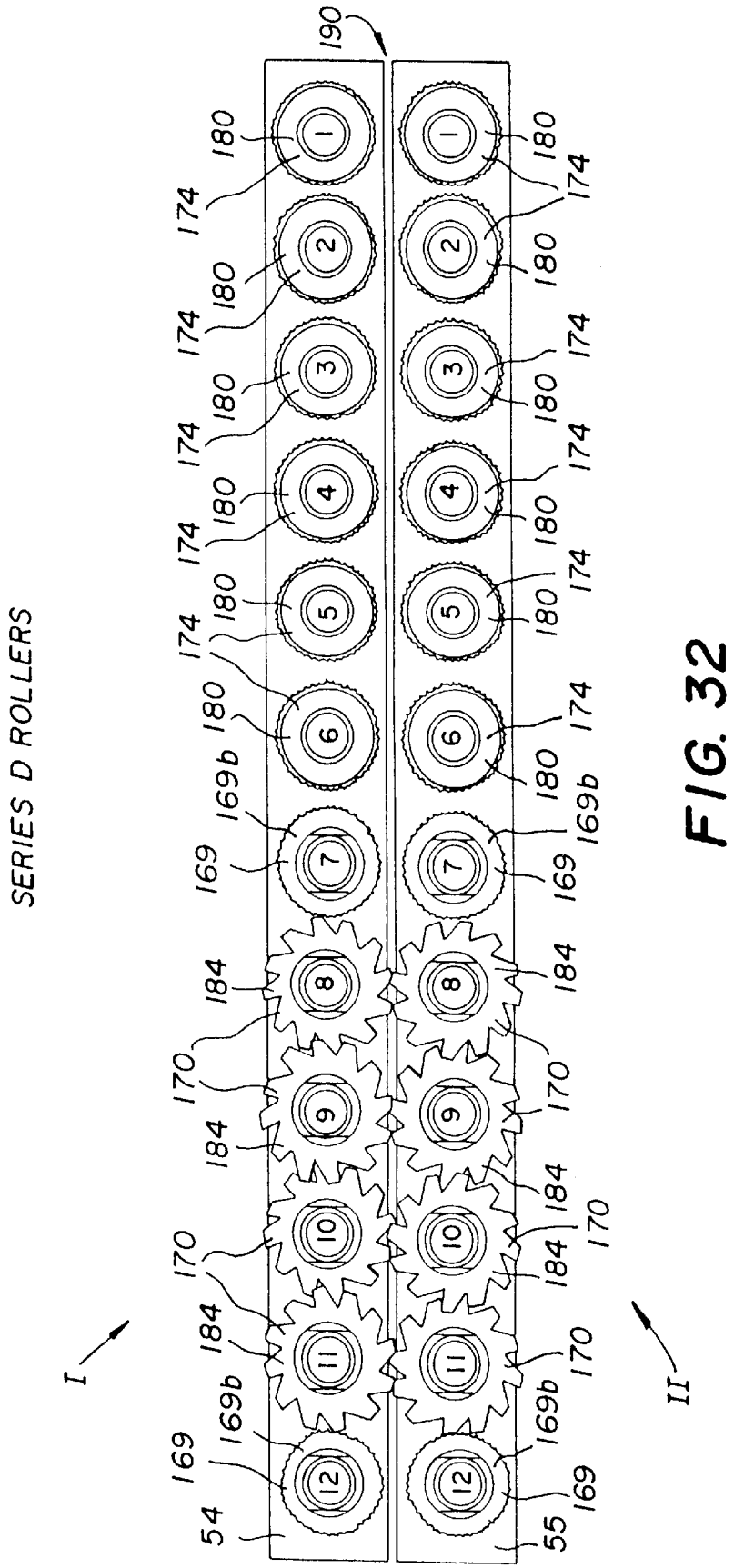
FIG. 32 is a side view of the permanent and adjustable rails with another of several contemplated roller combinations.
Figure 33:
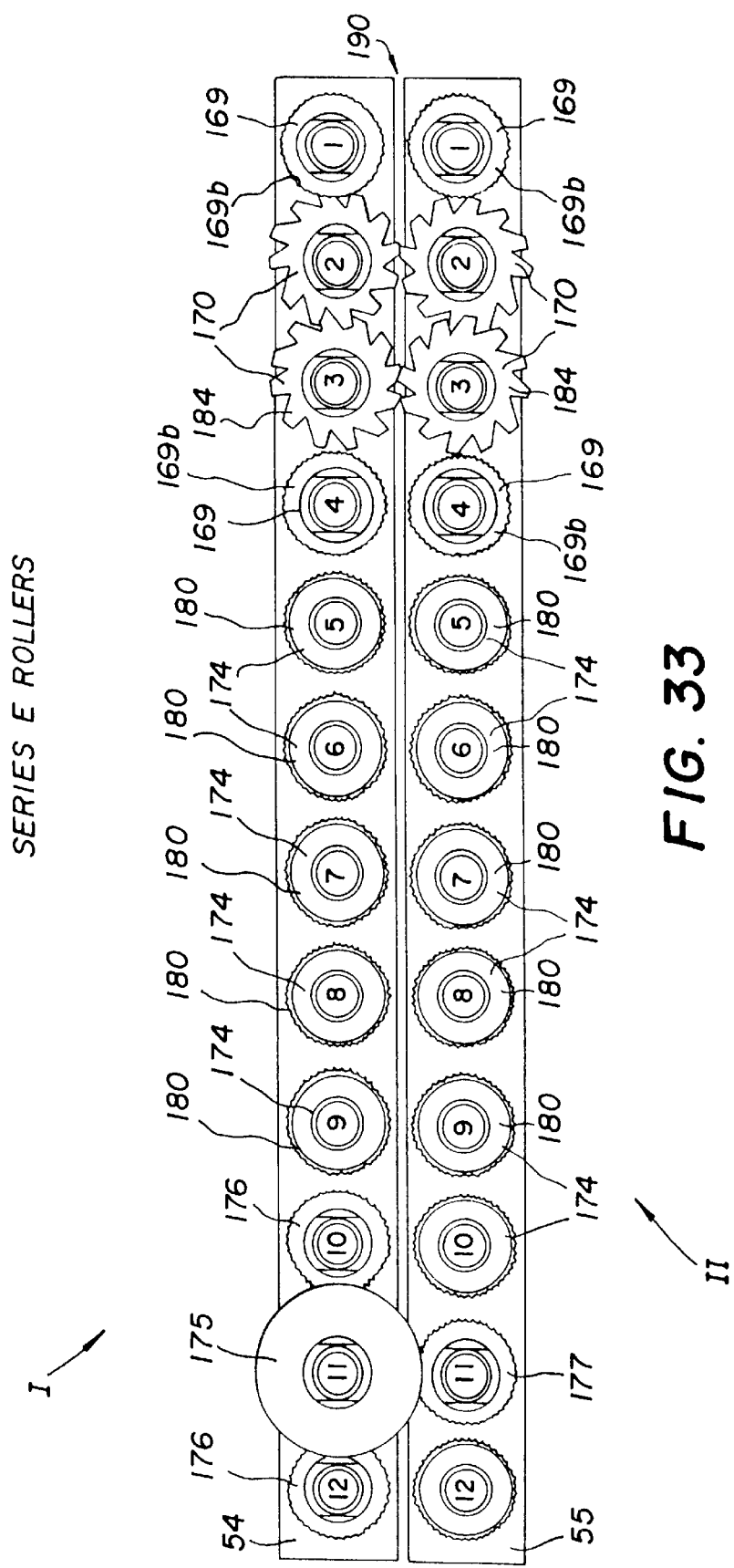
FIG. 33 is a side view of the permanent and adjustable rails with another of several contemplated roller combinations.

A bracket 136 is secured to the outer side at the middle region of each frame plate 41a. Each bracket 136 contains a brass receiver block 137 and hinges upward to connect onto an adjustment shaft ball 57 which engages the finisher conveyor belt assembly 43 with the out-feed conveyor 41 enabling the adjustment shaft to move the finisher conveyor belt assembly 43 upward or downward. See FIG. 18d. A screw 140 fastens block 137 and lid 138 onto bracket 136. Receiver block 137 is installed in pocket 141, and thus controlling the space between the out-feed conveyor belt assembly 41 and the finisher conveyor belt assembly 43. FIG. 18c shows how a lid 138 is installed onto a bass receiver block 137 for receiving a shaft ball 57, which in turn fits into a receiving a pocket 142 in each bracket 136. A screw 140 fastens the receiver block 137 and the lid 138 onto the corresponding bracket 136. The brackets 136 each pivot to receive the shaft ball 57 as shown in FIG. 18d by first loosening a bracket 136 securing knob 139. A pivot pin 136a is provided which extends through the bracket 136 lower end and into an adjustment plate 143 which in turn is adjustably mounted to the given frame plate 41a. A bracket anchor knob 139 is provided which has a knob shaft and which passes through a notch in a side of the bracket 136. Knob 139 engagingly bears against the bracket 136 to retain bracket 136 against pivoting until knob 139 is rotated to release the bracket 136 and thereby permit bracket 136 to rotate on pivot pin 136a. Rotation of bracket 136 out of vertical orientation permits the shaft ball 57 to drop down adjacent to pivoted bracket 136. See FIG. 18d. When the shaft ball 57 is adjacent to the bracket 136 the bracket 136 is pivoted to receive the shaft ball 57, and then securing knob 139 is rotated to screw into the given frame plate 41a and thereby tighten against and anchor the bracket 136 in its upright shaft ball, retaining position.

The finisher conveyor belt assembly 43 preferably includes a pair of spaced apart and parallel elongate plates 44a and contiguous frame hinge segments 110 and belt adjustor plates 113 together defining the finisher conveyor frame 44. See FIGS. 13–16. The frame plates 44a are interconnected by a series of conveyor support plates 134 over which the in-feed conveyor belt 43a rides. A conveyor drive pulley 111 on which the belt 43a rolls is provided at each end of frame 44. Conveyor drive pulleys 111 each extend between and are rotatably mounted to the frame plates 44a, each including two drive pulley cyclinders 126a mounted on a drive pulley shaft 117 which protrudes from the remote longitudinal ends of the drive pulley cyclinders 126a. A bushing 116 presses into an axial opening in the end of drive pulley shaft 117, and a roller installation pin 52 is inserted into an axial opening 118 in bushing 116. A spacer 114 is provided to increase the thickness of the frame plates 44a so that conveyor bushing 115 is longer and has more surface area for pulley shaft 117 to rotate within. Spacer 114 is secured to the adjacent frame plate 44a with conventional fasteners. The frame plates are interconnected by a series of rotatable mounted finisher conveyor rollers 119. A pin 196 fits into the finisher conveyor frame 44 and into the and secures conveyor frame 44 in place.

Belt adjustor plate 113 serves as a slide and pivot guide for hinge section 110 to permit hinge section 110 to pivot to a substantially right angle relative frame plates 44a for belt 43a mounting and removal. Belt adjustor plates 113 have three longitudinal adjusted slots 113a and a curved adjusted slot 113b through which the plate 113 mounting bolts 113c pass and screw into ports in the given hinge segment 110. Slots 113a and 113b in belt adjuster plates 113 permit hinge segments 110 to pivot to collapse the frame 44 and move one of the conveyor drive pulleys 111 inward to release a worn out belt 43a and to move the conveyor drive pulleys 111 back outward to engage a fresh belt 43a.

Figure 6A:
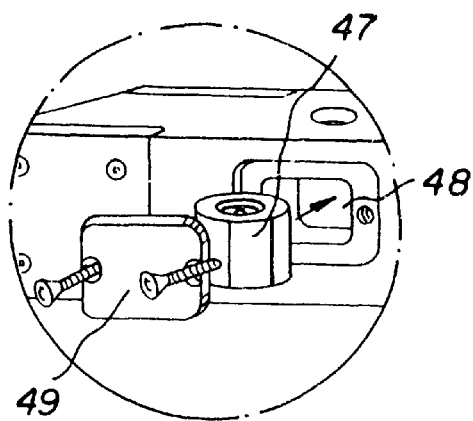
FIG. 6a is a perspective, close-up view of the brass adjustment shaft and pocket.

To adjust the distance between the finisher conveyor belt 43a and the out-feed conveyor belt 40a, finisher conveyor adjustment shafts 42 are provided having numbers and lines along their lengths used to determine the space between the first and second roller sets I and II while the cover 2 is on the machine. The adjustment shafts 42 are fitted into adjustment shaft guide tubes 45 used to guide the adjustment shaft 42 into a firmly held position and also used for calibrating the shaft 42 lines and numbers. Shafts 42 have gripping knobs 1. The adjustment shaft guide tubes are mounted into tube bores within adjustment shaft guide tube mounting blocks 46, one of which is bolted to a side of each of the hinge sections 110. Brass adjustment shaft threaded blocks 37 are provided which are replaceable and self-lubricating. Adjustment shafts 42 are calibrated to the proper position when the brass adjustment threaded blocks are rotated. Each adjustment shaft 42 has an adjustment shaft ball end 57 which extends through and protrudes from the bore in the mounting block 46. Adjustment shaft ball ends 57 extend into brackets 136 as described in the paragraphs which follow. As shown in FIG. 6a, a pocket 48 is used to insert threaded block 47, and a lid 49 is used to enclose each threaded block 47 within a pocket 48. Knobs 1 may be rotated to adjust the longitudinal angles between the series of rollers from entry to exit to determine the extent to which meat is flattened overall and the entry and exit roller spacings. Knobs 1 can also be rotated for left side or right side adjustment, to create sort of a lopsided spacing between roller sets, so that opposing roller ends converge toward each other on one side of the apparatus 300. This second optional adjustment is suited for processing meat pieces which are significantly thicker at one lateral end than at the other lateral end, so that the meat piece is oriented to place the thicker meat piece end at the narrower, converging lateral end of the roller sets. As a result, as the meat piece is fed between the roller sets I and II, the thicker meat piece end is flattened by essentially forcing the mass of meat at the thicker end to flow or become displaced along the meat piece toward the opposing meat thinner end, to create more uniformity in meat cross-section.

Figure 6B:
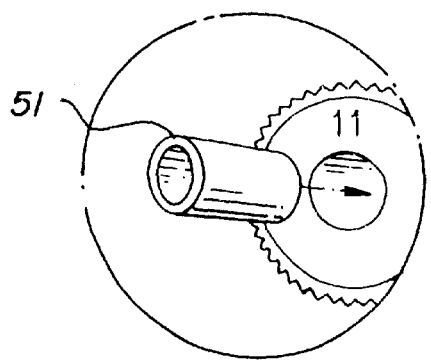
FIG. 6b is a perspective close-up view of a lubricated bushing positioned to be fit into a roller.
Figure 6C:
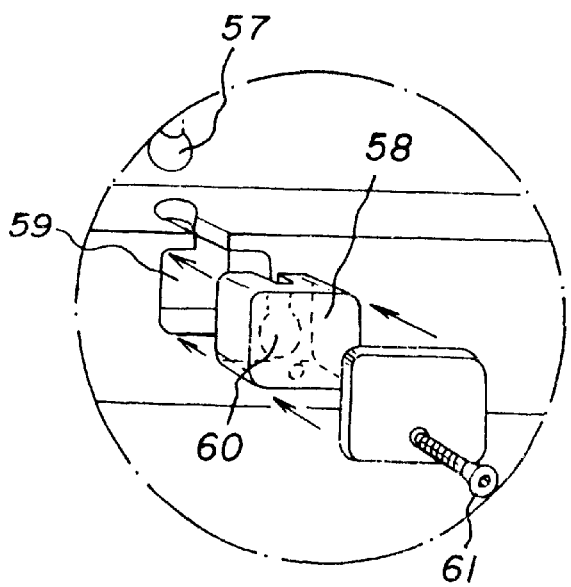
FIG. 6c is a perspective close-up view of the adjustment shaft ball end positioned to fit into a pocket in a rail, and showing the brass receiver block.

Lubricated bushings are installed into the roller that rotates around a roller installation pin 52. See FIG. 6. A screw 53 secures roller installation pin 52. FIG. 6 also shows the block 56 in which the conveyors assemblies 40 and 43 are supported after the conveyor assemblies 40 and 43 are installed. FIG. 6c shows the brass receiver block 58 used to connect with adjustment shaft 42, and the pocket 59 in the rail 54 used to install brass receiver block 58 into the rail 54. A pocket 60 inside brass receiver block 58 is installed onto adjustment shaft ball end 57 and screw 61 is used to secure pocket 58 into the rail. A screw 62 is used to mount bottom cover 29 onto conveyor frame 39. See FIG. 6. Reference numeral 63 marks the location in which the bottom out-feed conveyor 41 is mounted. Pin 197 secures conveyor 41 in place. Reference numeral 64 marks the location at which the finisher conveyor frame 44 is mounted. A screw 65 secures the frame 39 and the bottom cover 29 to the cabinet. A block 66 mounts idler sprocket 67 and takes up slack in chain 68. A chain tension screw 69 adjusts the tension in chain 68 when rotated to move inwardly or outwardly. See FIG. 7. A drive coupling 70 is provided and a drive shaft bushing block is mounted to a chain guide 72 and secures the extra long drive shaft 73. See FIG. 10. Chain guide 72 functions to guide the chain 68 around the sprocket so that the chain 68 does not skip off the idler sprocket 67. As shown in FIG. 10, an extra long drive shaft 73 rotates inside an extra long drive shaft bushing 74 in drive shaft bushing block 71. Other elements and their relationships to each other are illustrated in FIGS. 8–10, and include a spacer 75, a shaft bushing 76, a double sprocket 83 and drive shaft bushing 74, all fitted over extra long drive shaft 73. Shaft 73 passes through ports in adjustable drive side rail 93 and drive shaft bushing block 71. C-clip 77 snaps over drive shaft 73 and into slot 78 in drive shaft 73. A longitudinal locking key notch 79 is provided in an end of drive shaft 73 which receives a locking key 80. Sprocket set screws 82 are provided to tighten locking key 80 after key 80 is fitted into locking key notch 79. A single sprocket 83, double sprocket 84 and single sprocket 85 are illustrated in FIGS. 8, 9 and 11, respectively. It is contemplated that another embodiment of the invention might substitute gears and ball bearings for the chains, sprockets and bushings of this embodiment.

FIGS. 11 and 12 illustrate the conveyor paddle bushing 86 fitted around the conveyor drive paddle shaft 87, where paddle ends of shaft 87 go between the two conveyor drive pins 89 when conveyors are installed into the machine. See FIG. 13. A conveyor mounting pad 90 is secured to the side rail 93 and includes a central opening which registers with a shaft passing bore in the side rail 93. See FIG. 11. A spacer 95 is provided to keep idler sprocket 67 away from block 66. Sprocket 67 rotates on bushing 96 which fit around shaft bolt 97. A handle 98 is provided for use in installation of the finisher conveyor 44. A block 99 is used to enclose shaft threaded block 47, block 47 being removed from the finisher conveyor 44 to remove the finisher conveyor belt 43a. A set screw 199 is threaded through block 99 and presses against adjustment shaft guide tube 45 in the proper calibrated position with the adjustment shaft 42 so that the numbers and lines on shaft 42 are level and legible. Threaded block 47 is received in pocket 100, and lid 101 closes block 47 within block 99. See FIG. 14. Lid 101 is secured onto block 99 with a screw 102. A bushing 103 is pressed into each adjustment shaft guide tube 45 so that when the adjustment shaft 42 rotates it absorbs vibration and noise. Fastening knobs 104 on threaded shafts are provided for securing onto hinge sections 110, described below, by rotating the knobs 104 until they press tightly in the area of a notch 105. A notch 107 is provided so that conveyor scraper knob 108 tightens down and holds meat scraper 106 into place. A knob 109 on a threaded shaft is used to secure hinge section 110, which is hinged upward after the conveyor belt is installed.

The marinator spray device 10 fits into a cover opening 2a in the apparatus 300 removable cover 2 adjacent to one of the roller set I. See FIGS. 2 and 3. Device 10 preferably includes a mounting fitting 20 which is fastened to the outside of the cover 2 and extends into and through the cover opening 2a and has a central fitting port P surrounded by a protruding and internally and external threaded annular flange 20a. A fitting fastening nut 21 is screwed onto the annular flange 20a outer threaded to secure the mounting fitting 20 into the cover opening 2a and a sprayer nozzle 17 is screwed into the annular flange 20a internal threads, directed toward the interior of the cover 2 and toward the adjacent first roller set I. Nozzle 17 has external threads onto which a locking fitting 16 having internal threads is screwed. Locking fitting 16 has a radial mounting flange 16a protruding from its mid-section having notches 18 at its circumferential edge for receiving ends of mounting fitting fastening screws 19 such that when locking mount fitting 16 is rotated the notches 18 engage and lock to the fitting fastening screws 19. The end of locking fitting 16 opposite nozzle 17 is externally threaded and a marinate flow valve 15 having internal threads is screwed onto the locking fitting 16 external threads, the flow valve 15 having an operating lever 14 which can be manually operated by a person. A male quick release section 13 is screwed into the opposing end of the flow valve 15, and a marinate supply hose connector 11 is secured to the male quick release section 13. Hose connector 11 has a quick release button 12 for disconnecting from a marinate supply hose (not shown).

Marinator spray device 10 sprays a mist of water or marinate onto the top, first roller set I, so that the rollers of roller set I become wet with the water or marinate and press the marinate or water into the meat pieces as they pass in between all of the first and second roller sets I and II. In this way marinator spray device 10 adds marinate flavor to the meat or rehydrates the meat with water if the meat has lost its moisture and also may be used to keep the roller sets I and II clean of any sticky meat particles or other residue, if any, and to prevent the meat from sticking to the rollers, and thus prevents the meat from becoming pasty.

The motor assembly M and drive means for the rollers are as described in U.S. Pat. No. 5,850,786 issued to the present applicant. Motor activation is controlled from outwardly directed on/off switch 8 on cabinet 4. See FIG. 1. Switch 8 includes a switch bump guard 9. A removable electrical start and stop box assembly 25 is secured within cabinet 4 behind switch 8 which is removed by turning knobs 24 and is mounted onto the motor assembly M when the motor is removed for cleaning. See FIG. 4. An electrical start and stop box assembly pad 26 supports box assembly 25. A flexible electrical conduit 27 extends from the switch 8 to the motor assembly M.

The motor assembly M is secured to machine frame 36 with motor mounting knobs 35 on threaded motor mounting shafts extending into frame 36. Referring to FIGS. 20 and 21, the motor assembly M includes an electrical box 151, an electrical relay 152 and electrical breaker 153 within electrical box 151, and a gooseneck bracket 154. A magnetic safety switch 156 is installed into a gooseneck bracket 154, and when the in-feed conveyor 28 is installed magnetic safety switch 156 makes contact with a magnet 155 on the in-feed conveyor 28. See FIGS. 4 and 22–24. A pin 198 secures in-feed conveyor 28 to the drive means. A magnetic safety switch 157 is installed in a threaded hole 159 in electrical box lid 158. When the top cover 2 is installed on apparatus 300 the magnetic switch 157 makes contact with magnet 160, both the cover and the in-feed conveyor 28 must be installed in order for the machine to operate. A magnet 160 is provided so that, when the cover 2 is removed, apparatus 300 does not operate because the magnet disengages from the magnetic safety switch 156. A recessed pocket 194 is provided inside bump guard 9 into which magnet 160 is inserted and screw 195 secures magnet 160 to pocket 194. When top cover 2 is removed from the cabinet 4, the magnet 160 is no longer in contact with the magnetic switch 157, and as a result apparatus 300 cannot operate. A mounting pad 161 is provided for electrical start/stop switch assembly 25. See FIG. 10. This pad 161 is used when removing the motor assembly M from apparatus 300. The electrical start/stop switch 25 must be placed onto the pad 161. A hole 162 is provided in motor assembly 25 through which the threaded shafts of knobs 35 pass. A drive spider 163 absorbs friction, vibration and heat between the two drive couplings. An electrical wire cable 164 is provided for magnetic safety switch 156.

Removable top cover 2 is preferably removably secured over the machine frame 36, as shown in FIG. 1. Top cover 2 has a peripheral lower side edge with a series of vertical cover slots 6 which fit over threaded shafts of cover securing knobs 5 which extend into threaded ports in the lower cabinet 4. Tightening knobs 5 against top cover 2 secures top cover 2 onto cabinet 4 and over the apparatus 300 internal mechanisms. Cabinet 4 preferably includes cabinet doors 3 and lifting handles 7. Cabinet 4 is also designated the bottom cover 29, onto which top cover 2 fits. Bottom cover 29 includes a bottom cover drain assembly 30 assembly for draining the marinate or water after it drips through the rollers and falls onto the bottom cover 29. Drain assembly 30 includes a drain 32 containing a drain screen 31 and secured with a drain fastening nut 33. The bottom cover 29 is slopped toward the drain assembly 30 so that dripping liquid flows to and into drain 32. Spacers 38 are used to keep the bottom cover away from and mounted to the frame 36.

The functions of the optional rollers set forth in FIGS. 27–36 and designated as Series A–G are as follows. Series A rollers are used for tenderizing meat in the #2 and #3 positions and flattening meat in the #4 through #12 positions on apparatus 300. The #1 roller 169 feeds the meat pieces into the #2 tenderizing roller 170. This function permits the meat pieces to become internally tenderized with a smooth natural texture. Series B rollers are used for tenderizing meat pieces in the #2 through #5 positions and flattening the meat in the #6 through #12 positions on apparatus 300. The #1 roller 169 feeds the meat into the #2 tenderizing roller 170. This function permits the meat pieces to become internally tenderized with a smooth natural texture. Series C rollers are used for flattening meat pieces in the #1 through #9 positions and tenderizing in the #10 and #11 positions and the #12 scraper roller 169 pulls the meat pieces out of the tenderizing roller 170 and guides them on the out-feed conveyor belt assembly 41. When series C rollers are used the meat pieces has a coarse perforated texture. To maintain this coarse texture in the meat pieces so that they do not become smooth, finisher conveyor belt assembly 43 must be removed from apparatus 300. Series D rollers are used for flattening meat pieces in the #1 through #7 locations, for tenderizing meat pieces in the #8 through #11 locations, and #12 scraper roller #169 pulls the meat pieces out of the tenderizing roller 170 and guides the meat pieces onto the out-feed conveyor belt assembly 41. When the D series is used the meat pieces has a coarse perforated texture. Once again, to maintain this texture in the meat pieces so that they do not become smooth, the finisher conveyor belt assembly 43 must be removed from apparatus 300. Series E rollers are used for tenderizing in the #2 and #3 locations, for flattening in the #4 through #10 locations, and for strip or dice cutting in the #11 locations and the #12 roller guides the meat pieces onto the out-feed conveyor belt assembly 41. The #1 scraper roller 169 feeds the meat pieces into the #2 tenderizing roller 170. Series E is used for tenderizing meat pieces that have heavy muscle, for flattening the meat pieces to make them texture smooth and natural, and to strip or dice cut the meat pieces. Series F rollers are used for tenderizing in the #2 through #5 locations for flattening in the #6 through #10 locations and for strip or dice cutting in the #11 locations. The #12 rollers guide the meat pieces onto out-feed conveyor belt assembly 41. The #1 roller 169 feeds the meat pieces into the #2 tenderizing roller 170.

The F series is used for tenderizing meat pieces that have heavy muscle, for flattening the meat pieces to make the meat texture smooth and natural and for strip or dice cutting. Series G rollers are used for flattening in the #1 through #10 locations, for strip or dice cutting in the #11 location and the #12 roller guides the meat pieces onto the out-feed conveyor belt 41. The assembly G series is used for flattening meat to a specific thickness and then strip or dice cutting the meat pieces.

While the invention has been described, disclosed, illustrated and shown in various terms or certain embodiments or modifications which it has assumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim as my invention:

1. An apparatus for flattening meat without piercing nor shredding the meat, comprising:

a substantially horizontal first roller set, each roller in said first roller set having non-sharpened outer edges;

a substantially horizontal second roller set, each roller in said second roller set having non-sharpened outer edges, the first roller set directly opposing and being spaced and fully separated from the second roller set, said first and second roller sets together having a product in-feed end into which meat pieces are drawn and having a product out-feed end at which flattened meat pieces are expelled from between said first and second roller sets;

adjusting means for adjusting the spacing between the first roller set and the second roller set, wherein meat passing between the first and second roller sets is substantially flattened but not pierced nor shredded;

an out-feed conveyor belt assembly at said out-feed end, comprising a substantially horizontal out-feed conveyor belt and rolling means for rolling said out-feed conveyor belt in a direction to advance meat pieces placed on said out-feed conveyor belt away from said out-feed end;

and a finisher conveyor belt assembly at said out-feed end, said finisher conveyor belt assembly having a substantially horizontal finisher conveyor belt generally parallel with, opposing and spaced apart from said out-feed conveyor belt and rolling means for rolling said out-feed conveyor belt in a direction to advance meat pieces placed on said out-feed conveyor belt away from said out-feed end;

such that meat pieces expelled from between said out-feed end pass and are carried between said out-feed conveyor belt and said finisher conveyor belt by the rolling of said out-feed conveyor belt, and finisher conveyor drive pulley drive means, said finisher conveyor belt comprising smoothing means for smoothing said product.

2. An apparatus for flattening pieces of meat without piercing nor shredding the meat, comprising:

a first roller set, each roller in said first roller set having non-sharpened outer edges;

a second roller set, each roller in said second roller set having non-sharpened outer edges, said first roller set directly opposing and being spaced and fully separated from said second roller set, said first and second roller sets together having a product in-feed end into which meat pieces are drawn and having a product out-feed end at which flattened meat pieces are expelled from between said first and second roller sets;

adjusting means for adjusting the spacing between said first roller set and said second roller set, wherein meat passing between said first and second roller set is substantially flattened but not pierced nor shredded;

and an in-feed conveyor belt assembly at said in-feed end comprising an in-feed conveyor belt and rolling means for rolling said in-feed conveyor belt in a direction to advance meat pieces placed on said in-feed conveyor belt to said in-feed end;

wherein said in-feed conveyor belt assembly comprises an in-feed conveyor frame including a pair of spaced apart and substantially parallel elongate composite frame plates including pivotally connected frame hinge segments, said frame plates being interconnected by a series of in-feed conveyor support plates over which said in-feed conveyor belt rides as it rolls and by a series of in-feed conveyor support rods, and an in-feed conveyor drive pulley extending between and rotatably mounted to said composite frame plates at the longitudinal ends of said elongate composite frame plates.

3. The apparatus of claim 2, wherein said hinge segments each comprise a belt adjuster plate bolted to an end of each said frame plate and having an adjustment slot through which said adjuster plate mounting bolts pass and screw into ports in the given said frame plate, wherein said slot in said belt adjuster plates permit said hinge segments to pivot to collapse said frame and move one of said conveyor drive pulleys inward generally toward the other conveyor drive pulley to release said in-feed conveyor belt, and then to move said conveyor drive pulley outward and generally away from the other drive pulley to pull taut and thereby engage said in-feed conveyor belt.

4. An apparatus for flattening meat without piercing nor shredding the meat, comprising:

a first roller set, each roller in said first roller set having non-sharpened outer edges;

a second roller set, each roller in said second roller set having non-sharpened outer edges, the first roller set directly opposing and being spaced and fully separated from the second roller set, said first and second roller sets together having a product in-feed end into which meat pieces are drawn and having a product out-feed end at which flattened meat pieces are expelled from between said first and second roller sets;

adjusting means for adjusting the spacing between the first roller set and the second roller set, wherein meat passing between the first and second roller sets is substantially flattened but not pierced nor shredded;

an out-feed conveyor belt assembly at said out-feed end, comprising an out-feed conveyor belt and rolling means for rolling said out-feed conveyor belt in a direction to advance meat pieces placed on said out-feed conveyor belt away from said out-feed end;

and a finisher conveyor belt assembly at said out-feed end, said finisher conveyor belt assembly having a finisher conveyor belt generally parallel with, opposing and spaced apart from said out-feed conveyor belt and rolling means for rolling said out-feed conveyor belt in a direction to advance meat pieces placed on said out-feed conveyor belt away from said out-feed end;

such that meat pieces expelled from between said out-feed end pass and are carried between said out-feed conveyor belt and said finisher conveyor belt by the rolling of said out-feed conveyor belt, and finisher conveyor drive pulley drive means, said finisher conveyor belt comprising smoothing means for smoothing said product.

5. The apparatus of claim 4, wherein said out-feed conveyor belt assembly comprises an out-feed conveyor belt and an out-feed conveyor frame comprising a pair of opposing spaced apart and parallel elongate out-feed frame plates and each out-feed frame plate having contiguous frame hinge segment and belt adjustor plate, said opposing frame plates and said opposing belt adjustor plates being interconnected, respectively, by a series of conveyor support plates over which said out-feed conveyor belt rolls, an out-feed conveyor drive pulley on which said out-feed belt rolls at each end of said out-feed conveyor frame, an out-feed conveyor drive pulley extending between and rotatably mounted to each end of said frame plates and to said opposing belt adjustor plate on which said conveyor belt rolls.

6. The apparatus of claim 4, wherein said finisher conveyor belt assembly comprises a finisher conveyor belt and a finisher conveyor frame comprising a pair of opposing, spaced apart and parallel elongate finisher frame plates, said finisher frame plates each having a contiguous frame hinge segment and a finisher belt adjustor plate, said opposing finisher frame plates being interconnected by a series of conveyor support plates over which said finisher conveyor belt rolls and a conveyor drive pulley extending between and rotatably mounted to said opposing frame plates and said opposing finisher belt adjuster plates on which said finisher conveyor belt rolls, and conveyor drive pulley drive means.

7. The apparatus of claim 6, additionally comprising an adjustment plate adjustably mounted to each said frame plate, a bracket secured to each said frame plate, each bracket comprising a receiver block pivotally mounted to pivot into engagement with a adjustment shaft ball connecting said finisher conveyor belt assembly with said out-feed conveyor belt assembly, thereby enabling said adjustment shaft to move said finisher conveyor belt assembly toward and away from said out-feed conveyor belt assembly.

8. The apparatus of claim 4, additionally comprising a marinator assembly mounted adjacent to one said roller set, and said marinator assembly comprising a marinate supply means and marinator nozzle oriented to spray marinate onto said rollers for delivery onto meat pieces.

9. An apparatus for flattening pieces of meat without piercing nor shredding the meat, comprising:
   a substantially horizontal first roller set, each roller in said first roller set having non-sharpened outer edges;
   a substantially horizontal second roller set, each roller in said second roller set having non-sharpened outer edges, said first roller set directly opposing and being spaced and fully separated from said second roller set, said first and second roller sets together having a product in-feed end into which meat pieces are drawn and having a product out-feed end at which flattened meat pieces are expelled from between said first and second roller sets;
   adjusting means for adjusting the spacing between said first roller set and said second roller set, wherein meat passing between said first and second roller set is substantially flattened but not pierced nor shredded;
   an in-feed conveyor belt assembly at said in-feed end comprising a substantially horizontal in-feed conveyor belt and rolling means for rolling said in-feed conveyor belt in a direction to advance meat pieces placed on said in-feed conveyor belt to said in-feed end;
   a marinator assembly mounted adjacent to one said roller set, and said marinator assembly comprising a marinate supply means and marinator nozzle oriented to spray marinate onto said rollers for delivery onto meat pieces;
   and an apparatus cover with a cover opening;
   wherein said marinator assembly comprises: a mounting fitting fastened to the outside of said cover and extends into and through said cover opening and has a central fitting port surrounded by a protruding and an annular flange having annular interior threads and annular flange external threaded, and a fitting fastening nut screwed onto said annular flange external threads thereby securing said mounting fitting into said cover opening and a sprayer nozzle screwed into said annular flange internal threads, said nozzle having external threads onto which a locking fitting having locking fitting internal threads is screwed, said locking fitting having a radial mounting flange protruding from its mid-section with at least one notch at its circumferential edge for receiving ends of mounting fitting fastening screws such that when said locking mount fitting is rotated said at least one notch engages and locks to said fitting fastening screws, wherein said locking fitting has locking nozzle external threads and wherein a marinate flow valve with internal threads is screwed onto said locking fitting external threads, wherein said flow valve has an operating lever for manually operated by a person, said marinator assembly further comprising a male quick release section screwed into the opposing end of said flow valve, and a marinate supply hose connector secured to said male quick release section.

10. An apparatus for flattening meat without piercing nor shredding the meat, comprising:
   a first roller set, each roller in said first roller set having non-sharpened outer edges;
   a second roller set, each roller in said second roller set having non-sharpened outer edges, the first roller set directly opposing and being spaced and fully separated from the second roller set, said first and second roller sets together having a product in-feed end into which meat pieces are drawn and having a product out-feed end at which flattened meat pieces are expelled from between said first and second roller sets;
   adjusting means for adjusting the spacing between the first roller set and the second roller set, wherein meat passing between the first and second roller sets is substantially flattened but not pierced nor shredded;
   and an out-feed conveyor belt assembly at said out-feed end, comprising an out-feed conveyor belt and rolling means for rolling said out-feed conveyor belt in a direction to advance meat pieces placed on said out-feed conveyor belt away from said out-feed end;
   wherein at least one roller of said first roller set and said second roller set comprises a scraper roller.

11. An apparatus for flattening pieces of meat without piercing nor shredding the meat, comprising:
   a substantially horizontal first roller set, each roller in said first roller set having non-sharpened outer edges;
   a substantially horizontal second roller set, each roller in said second roller set having non-sharpened outer edges, said first roller set directly opposing and being spaced and fully separated from said second roller set, said first and second roller sets together having a product in-feed end into which meat pieces are drawn and having a product out-feed end at which flattened meat pieces are expelled from between said first and second roller sets;
   adjusting means for adjusting the spacing between said first roller set and said second roller set, wherein meat passing between said first and second roller set is substantially flattened but not pierced nor shredded;
   and an in-feed conveyor belt assembly at said in-feed end comprising a substantially horizontal in-feed conveyor belt and rolling means for rolling said in-feed conveyor belt in a direction to advance meat pieces placed on said in-feed conveyor belt to said in-feed end;
   wherein at Least one roller of said first roller set and said second roller set comprises a scraper roller.

* * * * *